US009097543B2

(12) United States Patent
Kato et al.

(10) Patent No.: US 9,097,543 B2
(45) Date of Patent: Aug. 4, 2015

(54) ROAD INFORMATION UPDATING SYSTEM AND NAVIGATION APPARATUS

(71) Applicant: DENSO CORPORATION, Kariya, Aichi-pref. (JP)

(72) Inventors: Noriko Kato, Toyoake (JP); Takamitsu Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 277 days.

(21) Appl. No.: 13/648,657

(22) Filed: Oct. 10, 2012

(65) Prior Publication Data

US 2013/0096829 A1 Apr. 18, 2013

(30) Foreign Application Priority Data

Oct. 13, 2011 (JP) .................................. 2011-225841
Mar. 26, 2012 (JP) .................................. 2012-069408

(51) Int. Cl.
*G01C 21/34* (2006.01)
*G08G 1/123* (2006.01)
*G01C 21/32* (2006.01)
*G01C 21/30* (2006.01)

(52) U.S. Cl.
CPC ................ *G01C 21/32* (2013.01); *G01C 21/30* (2013.01); *G01C 21/3446* (2013.01)

(58) Field of Classification Search
USPC .................................. 701/400, 408, 410, 533
See application file for complete search history.

(56) References Cited

U.S. PATENT DOCUMENTS

| 6,154,152 | A * | 11/2000 | Ito ................................. 340/988 |
| 6,202,024 | B1 * | 3/2001 | Yokoyama et al. ........... 701/420 |
| 2007/0282524 | A1 | 12/2007 | Tanizaki et al. |
| 2008/0208451 | A1 * | 8/2008 | Minami ........................ 701/201 |
| 2009/0112458 | A1 * | 4/2009 | Nakai ........................... 701/201 |
| 2010/0179755 | A1 * | 7/2010 | Kohno et al. ................. 701/208 |
| 2012/0046860 | A1 * | 2/2012 | Curtis et al. .................. 701/418 |

FOREIGN PATENT DOCUMENTS

| JP | 2000-244494 | 9/2000 |
| JP | 3557776 | 5/2004 |
| JP | 2011-059255 | 3/2011 |

OTHER PUBLICATIONS

Office action dated Aug. 5, 2014 in corresponding Japanese Application No. 2012-069408.
Office action dated Jan. 7, 2014 in corresponding Japanese Application No. 2012-069408.

* cited by examiner

*Primary Examiner* — Mussa A Shaawat
*Assistant Examiner* — Abdhesh Jha
(74) *Attorney, Agent, or Firm* — Harness, Dickey & Pierce, PLC

(57) ABSTRACT

A road information update system comprising a navigation apparatus and an information center is disclosed. The navigation apparatus collects a travel trace when traveling a new road not present in a road map data, and sends the collected travel trace to the information center. The information center compares multiple road map data to extract a new road and an abandoned road, and generates multiple road change models based on the abandoned road and the new road. The information center receives the travel trace in the new road from the navigation apparatus, and estimates the new road and the abandoned road based on the received travel trace in the new road and the road change models.

18 Claims, 18 Drawing Sheets

(ROUTE RETRIEVAL UNSUCCESSFUL)

(ROUTE RETRIEVAL SUCCESSFUL)

ADDITION OF LINKS "h1", "h2"
AND DELETION OF LINK "e1"
ARE GROUPED AS MAP DIFFERENCE DATA

| MODEL NO. | XX-XX |
|---|---|
| ROAD INTENDED USE | FROM FREEWAY TO FREEWAY |
| CHANGE PATTERN | BEFORE CHANGE → AFTER CHANGE  |
| ACCEPTABLE JUDGMENT VALUE | BEFORE CHANGE → AFTER CHANGE  |
| GUIDE INFO | GRAPHIC INFO     GUIDE ATTRIBUTE  |

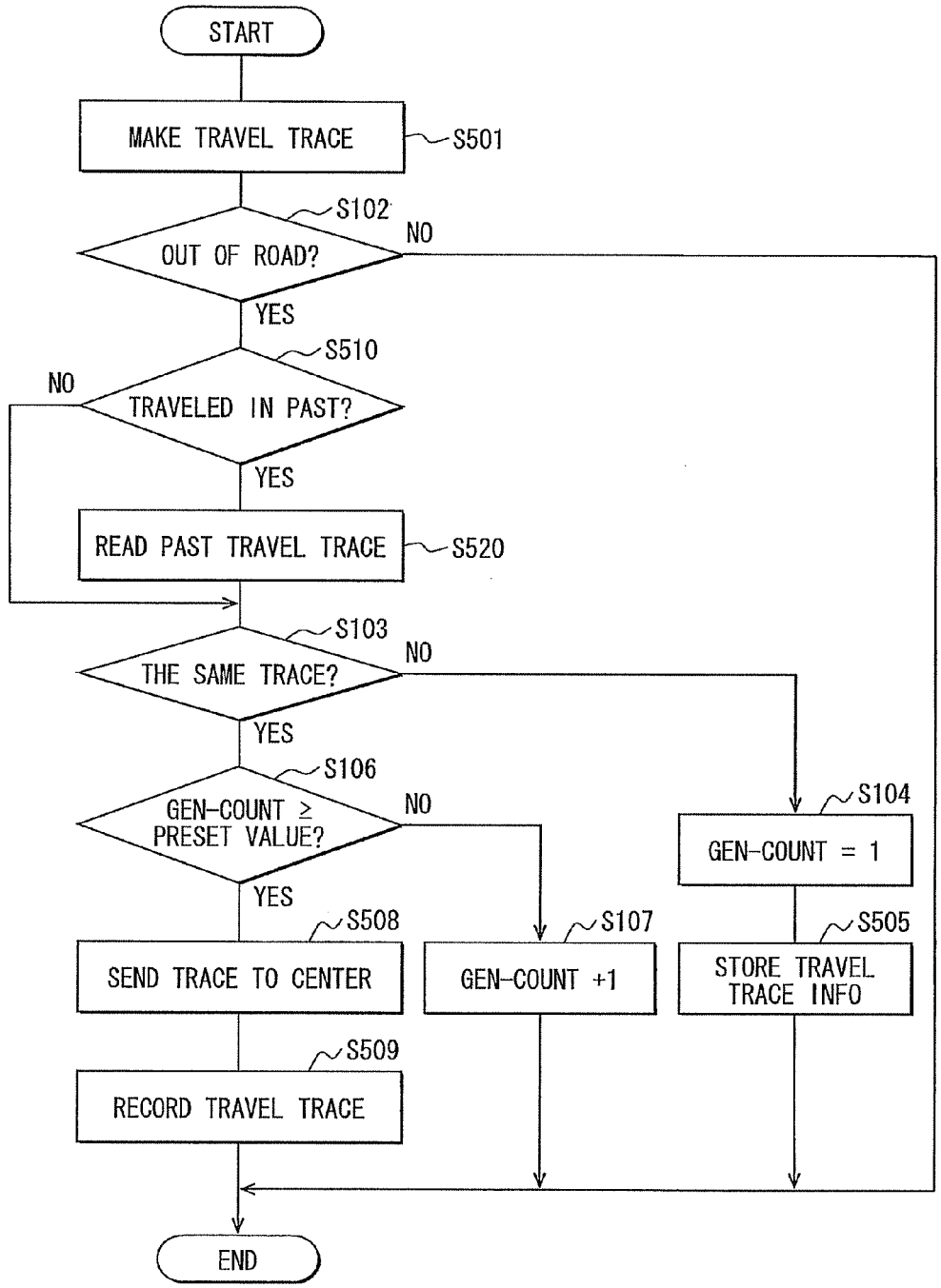

ROAD INFORMATION UPDATING SYSTEM AND NAVIGATION APPARATUS

CROSS REFERENCE TO RELATED APPLICATION

The present application is based on and claims priority to Japanese Patent Applications No. 2011-225841 filed on Oct. 13, 2011 and No. 2012-69408 filed on Mar. 26, 2012, disclosures of which are incorporated herein by reference.

TECHNICAL FIELD

The present disclosure relates to a road information update system for updating a road data, and also relates to a navigation apparatus.

BACKGROUND

In Japanese Patent No. 3557776, when a vehicle travels on a new road which is not present in a road map data stored in a storage medium, a navigation apparatus (e.g., a car navigation apparatus mounted to the vehicle) recognizes the new road based on a travel trace of the vehicle and sends information on the recognized new road to an information center. The information center updates a road map data based on the received new road information. That is, the information center has a new road learning function. However, the new road learning function described in Japanese Patent No. 3557776 cannot detect a road that is actually abandoned.

According to the new road learning function of Japanese Patent No. 3557776, the new road can be added. However, when a road is abandoned because of, for example, a new road construction, the abandoned road remains, and as a result, a route guidance using the abandoned road may be performed.

Additionally, in Japanese Patent No. 3557776, when the road map data is updated, all the updated road map data is transmitted to the navigation apparatus. That is, an excessively-large amount of data is transmitted to the navigation apparatus. This is also the case of a road instruction data. That is, all the road guidance data (road map data, road instruction data), which is an excessively-large amount of data, is transmitted.

SUMMARY

In view of the foregoing, it is an object of the present disclosure to provide a road information update system capable of estimating a road which meets an actual road situation, and to provide a navigation apparatus capable of performing route guidance taking into account an actual road situation.

It is also an object of the present disclosure to provide a road information update system that can reduce an amount of data to be transmitted when a road data is updated in an information center, and to provide a navigation apparatus that uses such a road information update system.

It is also an object of the present disclosure to provide a navigation apparatus that, before a high precession update of a roadmap data, can perform route guidance taking into account an actual road situation.

According to a first example of the present disclosure, a road information update system including a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data and includes: a center-side communication device that communicates with the navigation apparatus; and a model generation device that compares multiple road map data to extract a road change part in which an abandoned road and a new road are present, thereby generating multiple road change models based on the abandoned road and the new road, wherein the new road is a newly-constructed road. The navigation apparatus further includes a travel trace information collection device that, at least when the movable body travels the new road not present in the first road map data, collects information on the travel trace in the new road, wherein the travel trace is detected by the travel trace detection device, wherein the navigation-side communication device sends the collected information on the travel trace of the traveling of the new road to the information center. The information center further includes an estimation device that, upon receipt of the information on the travel trace in the new road from the navigation apparatus, estimates the new road and the abandoned road based on (i) the received information on the travel trace in the new road and (ii) the road change models generated by the model generation device. The information center incorporates the new road and the abandoned road estimated by the estimation device into the second road map data.

According to a second example of the present disclosure, a road information update system including a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes a center-side communication device that communicates with the navigation apparatus. The information center also has the first road map. The information center is configured to: receive information on a departure point and a destination point of the movable body from the navigation apparatus; perform, by using the first road map data, a process of calculating a first route from the departure point to the destination point and a process of calculating guidance information of the calculated first route; perform, by using the second road map data, a process of calculating a second route from the departure point to the destination point and a process of calculating guidance information of the calculated second route; compare the guidance information of the first route with the guidance information of the second route; and send guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route. The navigation apparatus is configured to: receive the guidance information cancellation information and the guidance information addition information from the information center; and incorporate the cancellation of the guidance information and the addition of the guidance information into the guidance information of the first route based on the received guidance information cancellation information and the received guidance information addition information.

According to a third example of the present disclosure, a navigation apparatus mountable to a movable body for traveling on a road may be configured as follows. The navigation apparatus include: a travel trace detection device that detects a travel trace of the movable body; a storage device that stores a first road map data; and a communication device that transmits information to an outside of the navigation apparatus. The navigation apparatus is configured to: send information on a departure point and a destination point of the movable body to an information center; perform, by using the first road map data, a process of calculating a first route from the departure point to the destination point of the movable body and a process of calculating guidance information of the first route; and, upon receipt of guidance information cancellation information and guidance information addition information from the information center, incorporate cancellation of the guidance information and addition of the guidance information into the guidance information of the first route based on the received guidance information cancellation information and the received guidance information addition information.

According to a fourth example of the present disclosure, a navigation apparatus may be configured as follows. The navigation apparatus may include: a travel trace detection device that detects a travel trace of a movable body; a storage device that stores a first road map data; a communication device that transmits information to an outside of the navigation apparatus; an estimation device that estimates a new road and an abandoned road based on (i) the travel trace detected by the travel trace detection device when the movable body travels on the new road detected and (ii) a road change model of the new road and the abandoned road, the road change model being provided in the navigation apparatus; and means for incorporating the new road and the abandoned road estimated by the estimation device into the first road map data.

According to a fifth example of the present disclosure, a model generation device may be configured as follows. The model generation device includes: a difference group generation portion that generates a difference group by grouping, as the difference group, a map difference data corresponding to a road change based on road update information or road map data; a difference group storage portion that stores the generated difference group; a model storage portion that stores multiple road change models; and a model extraction portion that checks the difference group against the road change models in the model storage portion, and generates a new road change model based on the difference group in response to a mismatch between the difference group and the road change models.

According to a sixth example of the present disclosure, a road information update system comprising a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes: a center-side communication device and a model generation device. The center-side communication device communicates with the navigation apparatus. The model generation device compares multiple road map data to extract a road change part where an abandoned road and a new road, which is a newly-constructed road, are present. The model generation device generates multiple road change models based on the abandoned road, roads before and after the abandoned road, the new road, and roads before and after the new roads. The navigation apparatus further includes a travel trace information collection device and an estimation device. The travel trace information collection device collects information on the travel trace in the new road at least when the movable body travels on the new road not present in the first road map data, wherein the travel trace is detected by the travel trace detection device, wherein the navigation-side communication device sends the collected information on the travel trace in the new road to the information center. Upon receipt of the information on the travel trace in the new road and the roads before and after the new roads from the navigation apparatus, the estimation device estimates the new road and the abandoned road based on (i) the received information on the travel trace in the new road and the roads before and after the new road and (ii) the road change models generated by the model generation device. The information center incorporates the new road and the abandoned road estimated by the estimation device into the second road map data.

According to a seventh example of the present disclosure, a road information update system comprising a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes a center-side communication device and a model generation device. The center-side communication device communicates with the navigation apparatus. The model generation device compares multiple road map data to extract a road change part where an abandoned road and a new road, which is a newly-constructed road, are present. The model generation device generates multiple road change models based on the abandoned road and the new road. The navigation apparatus further includes a first travel trace information collection device and a second travel trace information collection device. The first travel trace information collection device collects information on the travel trace in the new road at least when the movable body travels on the new road not present in the first road map data, wherein the travel trace is detected by the travel trace detection device. The second travel trace information collection device collects information on the travel trace in the abandoned road, which was detected in past in the first road map data by the travel trace detection device before the movable body travels on the new road. The navigation-side communication device sends the collected information on the travel trace in the new road and the collected information on the travel trace in the abandoned road to the information center. The information center further includes an estimation device. Upon receipt of the information on the travel trace in the new road and the information on the travel trace in the abandoned road from the navigation apparatus, the estimation device estimates the new road and the abandoned road based on (i) the received information on the travel trace in the new road, (ii) the received information on the travel trace in the abandoned road and (iii) the road change models generated by the model generation device. The information center incorporates the new road and the abandoned road estimated by the estimation device into the second road map data.

BRIEF DESCRIPTION OF THE DRAWINGS

The above and other objects, features and advantages of the present disclosure will become more apparent from the following detailed description made with reference to the accompanying drawings. In the drawings:

FIG. 20 is a flowchart illustrating a control operation of a navigation apparatus of a fourth embodiment.

DETAILED DESCRIPTION

First Embodiment

Figure 1:
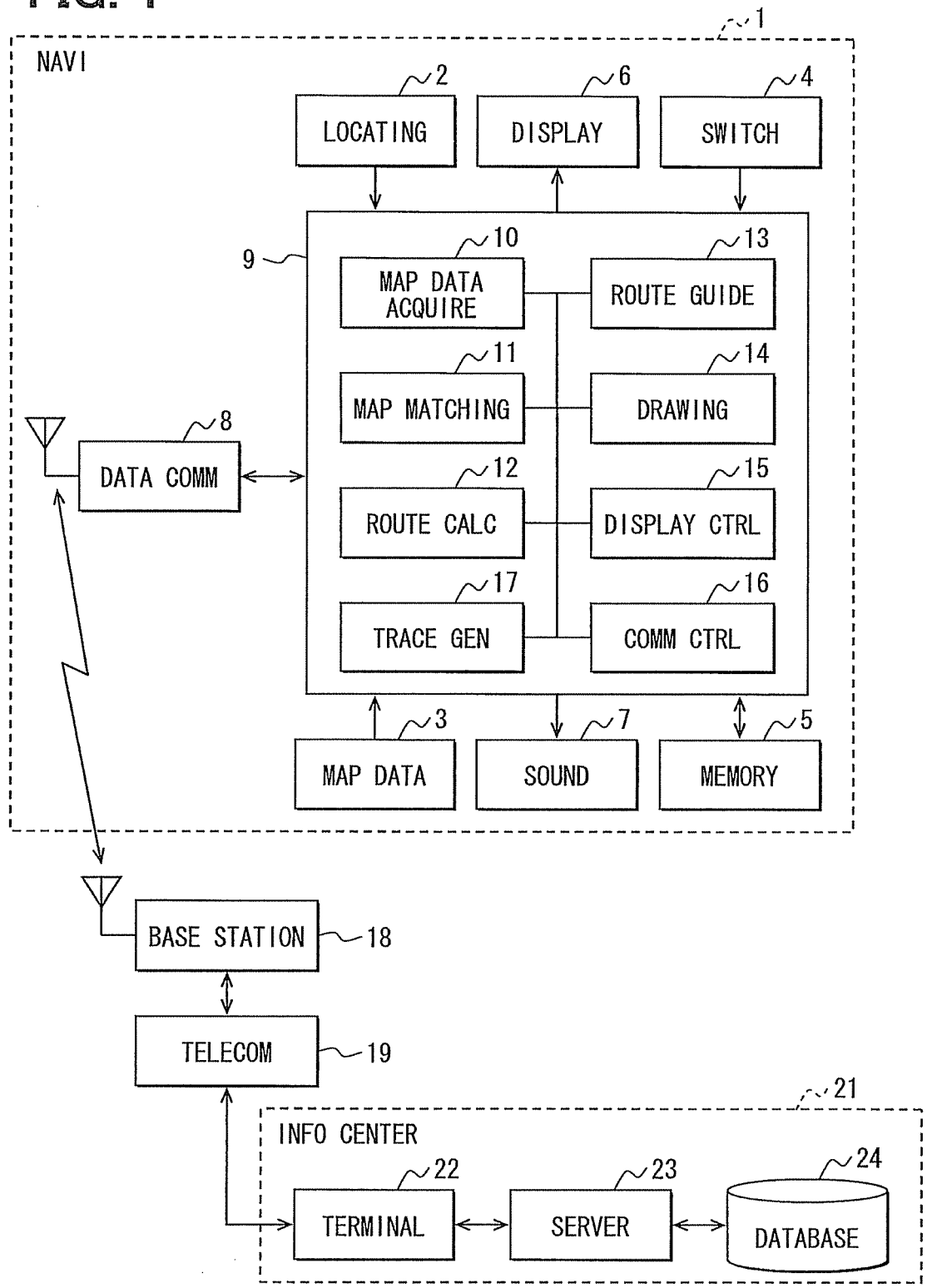
FIG. 1 is a functional block diagram illustrating a road map information update system of a first embodiment.

A first embodiment will be described with reference to FIGS. 1 to 7. FIG. 1 is a functional block diagram schematically illustrating a configuration of road information update system. This system includes navigation apparatuses 1 and an information center 21. The navigation apparatuses 1 may be mounted to multiple vehicles (which are examples of movable bodies). For simplicity, one of the navigation apparatuses 1 is depicted in FIG. 1. The information center 21 may be provided as a facility fixed at a predetermined location on a ground.

As shown in FIG. 1, the navigation apparatus 1 includes a position detection device 2, a map data storage device 3, a switch information input device 4, a memory device 5, a display device 6, a speech output device 7, a data communication device 8 and a controller 9.

The position detection device 2 includes a GPS sensor, a gyro-sensor, a vehicle speed sensor and/or the like, and has a function to detect present position of the vehicle. As long as the present position is detectable, the position detection device 2 may include not all of the foregoing sensors but may include at least one of the sensors. However, when the position detection device 2 includes the GPS sensor, the vehicle position can be accurately detected. Thus, in the following, it is assumed that the position detection device 2 includes at least the GPS sensor.

The map data storage device 3, which can correspond to a storage device or means, includes, for example, a DVD player, a hard disk drive, a CD player or the like. The map data storage device 3 stores a road map data (first road map data) including road map information. The road map data in the map data storage device 3 stores predetermined road numbers associated with respective roads. Additionally, for a certain road, the road map data stores predetermined road numbers associated with respective sections of the certain road.

The switch information input device 4 may include switches which are attached on a left/right side and/or an upper/lower side of a display of the display device 6. Via the switch information input device 4, a driver can perform various selection operations, instructions inputting operations, destination setting, or the like. The memory device 5 includes, for example, a ROM and a RAM. The ROM stores programs for execution of various processes including a program for navigation. The RAM of the memory device 5 includes a working memory area of a program and an area for temporarily storing a road map data acquired from the map data storage device 3.

The display device 6 may display a map for navigating the driver, and may display a destination setting screen or the like. The speech output device 7 outputs a speech for navigating the driver and a speech for providing a screen-operation explanation. The data communication device 8 has a two-way communications function. The data communication device 8 may include a cellular phone and a car telephone.

The controller 9 can control the forgoing parts of the navigation apparatus 1. The controller 9 includes a map data acquisition device 10, a map matching device 11, a route calculation device 12, a route guidance device 13, a drawing device 14, a display control management device 15, a communication control device 16 and a travel trace generation device 17. Operations of these devices will be described.

The map data acquisition device 10 acquires a map data used in each device of the controller 9 from the map data storage device 3 as described later. The map data acquisition device 10 provides the map data to each device of the controller 9. It should be noted that processes of the map data acquisition device 10 and processes of other devices are performed with use of the ROM or the RAM of the memory device 5.

The map matching device 11 specifies a road on which the present position is present, based on the present position of the vehicle detected by the position detection device 2, a road shape data of the map data acquired from the map data storage device 3 and the like. In the above processes, the map data acquisition device 10 acquires a necessary map data from the map data storage device 3.

The route calculation device 12 calculates a route from the present position calculated by the map matching device 11 or the departure point designated by the driver to a destination point. The destination point may be set such that after operating the switch information input device 4 to display a his or her desired map, the drive may set the destination point.

The route guidance device 13 calculates a guidance such as a guidance point and a guidance content (navigation contents such as instructions for making a right turn, a left turn or the like) based on a route calculation result, a road shape data, information stored in the road map data, and the like. The information stored in the road map data may include intersection location information, railroad crossing location information and the like. When the vehicle travels on the route calculated and set in the above, the route guidance device 13 performs a route guidance based on the guidance calculated by the route guidance device 13.

The drawing device 14 draws and displays a map around the present position, a simplified map of express way, an enlarged view of an intersection or the like on the display device 6 in accordance with instructions from the display control management device 15. When the vehicle is around the intersection, the enlarged view of an intersection may be displayed.

The travel trace generation device 17, which can correspond to a travel trace detection device or means, generates a travel trace of the own vehicle based on a position data from the position detection device 2. As will be described in detail later, when a predetermined condition is satisfied, travel trace information i.e., new road information is accumulated in the memory device 5.

Every time a driver inputs instructions by using the switch information input device 4 or a predetermined time has elapsed, the communication control device 16 instructs the data communication device 8 to transition to a manually communicable state, which is a state where the data communication device 8 is mutually communicable with the information center 21. Additionally, when the data communication device 8 receives a request from the information center 21, the communication control device 16 instructs the data communication device 8 to become the mutually communicable state with the information center 21. When the data communication device 8 becomes the mutually communicable state with the information center 21, the travel trace information (new road information) stored in the memory device 5 is uploaded to the information center 21. When the communication control device 16 requests the information center 21 to distribute information or when the information center 21 requests the communication control device 16 to send information, the communication control device 16 receives the information, which is distributed (sent) from the information center 21 in accordance with the request, and records the information in the memory device 5. The information distributed from the information center 21 may include an application program, a map data, route guidance instruction information or the like. The data communication device 8 and the communication control device 16 may correspond to a communication device or means.

The information center 21 is connected to a wireless base station 18 via a telephone exchange 19. The wireless base station 18 is communicable with vehicle. Data exchange between the wireless base station 18 and the navigation apparatus is performed. The information center 21 includes a circuit terminal device 22 (which can correspond to a communication device or means) for performing communication via the telephone exchange 19, a server 23 for processing necessary information, and a database 24 (storage) for storing necessary information. In the information center 21, the database 24 stores a data such as the travel trace information (new road information) acquired from the navigation apparatus 1 of the vehicle or the like. The information center 21 acquires the travel trace information (new road information), information on a present position and a destination point of the vehicle acquired from the navigation apparatus 1 of the vehicle. Based on the acquired information and the road map data in the database 24, the server 23 of the information center 21 performs data processing and records a result of the data processing in the database 24. The data processing may include a new/old road estimation process (first embodiment), a route calculation process, a route guidance comparison process (second embodiment), or the like. In the second embodiment, the information center 21 has a function to send a route guidance comparison result from the circuit terminal device 22 to the navigation apparatus 1 that had sent the information on the present position and the destination point.

Figure 2:
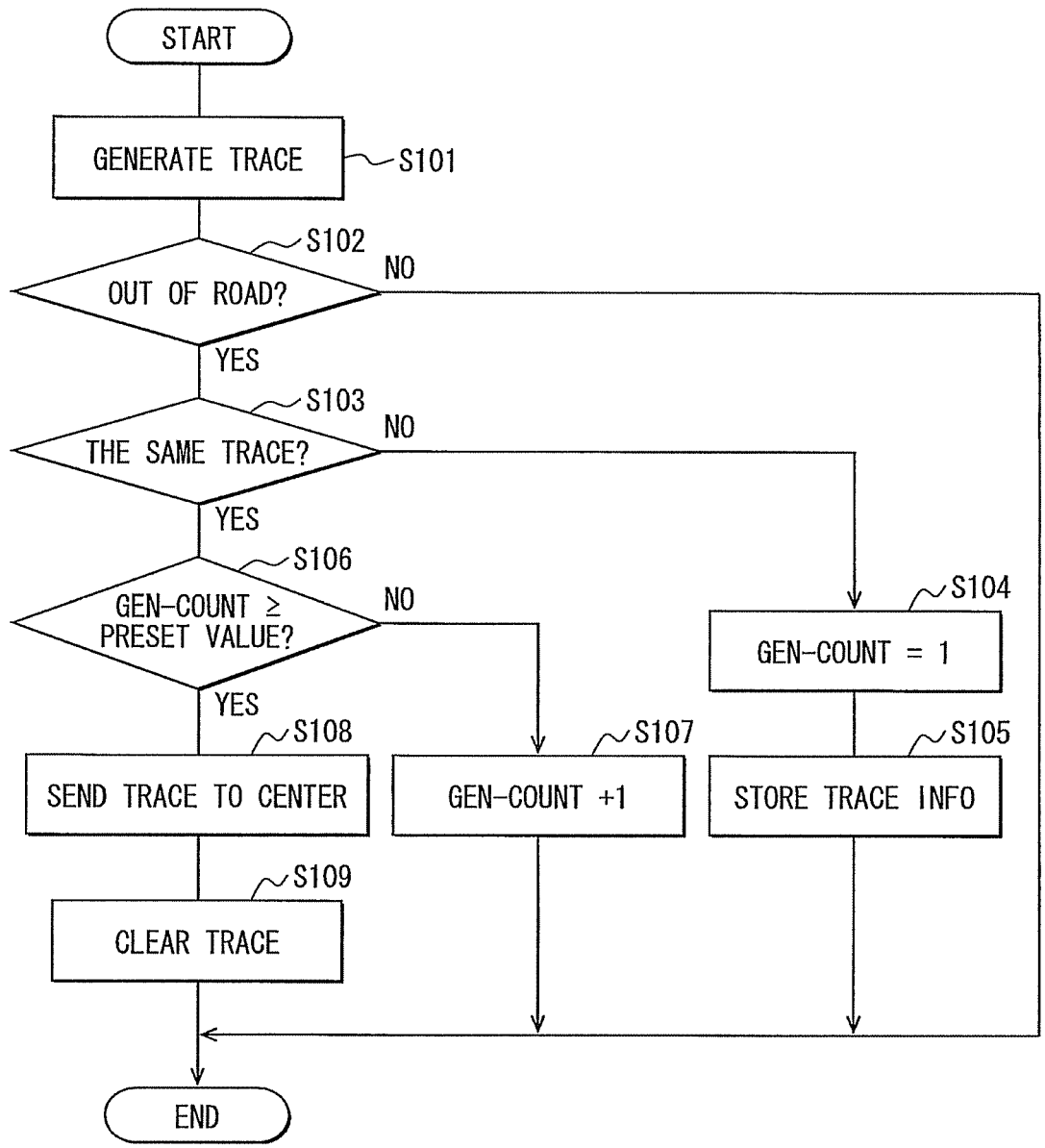
FIG. 2 is a flowchart illustrating a control operation of a navigation apparatus.

The data processing performed by the navigation apparatus 1 and the information center 21 will be described with reference to FIGS. 2 to 7. FIG. 2 is a flowchart illustrating a process performed by the controller 9 of the navigation apparatus 1. In the process, the travel trace is accumulated, and is sent to the information center 21 upon satisfaction of the predetermined condition. Specifically, at S101, the travel trace generation device 17 imports a present position coordinate point (longitude and latitude value detected by the position detection device 2) every a predetermined time (e.g., every 1 to 5 seconds), and generates information on the travel trace. Note that this travel trace tells a traveling direction. Additionally, the travel trace tells a movement distance and a time taken to move the movement distance, and thus, can tell an average travel speed.

At S102, the controller 9 compares the travel trace obtained at S101 with the road shape data of the road map data acquired from the map data storage device 3, and determines whether or not the travel trace is in an out-of-road state. When the travel trace is in the out-of-road state (YES at S102), the controller 9 compares the travel trace with the already-accumulated travel traces to determine whether or not there is a similar travel trace. When there is no similar travel trace (NO at S103), the controller 9 sets a count of generation to 1 at S104, and then, the controller 9 accumulates the information, which includes the information on the travel trace, in the memory device 5 at S105, and thereafter, this process is ended. In other words, the information on the travel trace and related matters (also called herein travel trace information) is accumulated on assumption that the road not present in the road map data is newly constructed. Specifically, the travel trace information is information including, for example, the travel trace, time intervals of recording position coordinates forming the travel trace, the count of generation of the travel trace, and the like. The controller 9 can correspond to a travel trace information collection device or means and a first travel trace information collection device or means.

The determination S102 as to whether or not the travel trace is in the out-of-road state may use the map matching process of the map matching device 11. For example, when a degree of coincidence (similarity degree) in the map matching between the travel trace and the road shape data is low (or no coincidence), it may be determined that the travel trace is in the out-of-road state. In the above, for example, a bypass road provided during road repairing may not be included in the new road. This kind of bypass road may be short in road distance, parallel to the repairing road, and close to the repairing road. The travel trace associated with this kind of bypass road may not be, based on its nature, adopted as the travel trace of the new road to be accumulated.

In accumulation of the information including the travel trace in the memory device 5 at S105, not only the new road not present in the map (out-of-road portion) but also a road before the new road and a road after the new road are recorded. In other words, in addition o the new road, the roads before and after the new road are recorded as a set.

When there is the similar travel trace (YES at S103), the process proceeds to S106. At S106, it is determined whether or not the count of generation of the travel trace is greater than or equal to a predetermined value. When the count of generation of the travel trace is less than the predetermined value (NO at S106), the count of generation of the travel trace is incremented by 1 at S107, and then, this process is ended.

In the above way, the similar travel trace is generated and the count of generation of the travel trace is increased. When the count of generation of the travel trace becomes greater than or equal to the predetermined value (YES at S106), the process proceeds to S108. At S108, the travel trace information accumulated at S105, that is, the new road information, is sent to the information center 21. Thereafter, at S109, the information on the travel trace etc. that has been sent is cleared from the memory device 5, and thereafter, this process is ended. In the above, the already-sent information on the travel trace etc. is cleared from the memory device 5 at S109. Alternatively, information indicating that the information on the travel trace etc. has been already sent may be recorded in the memory device 5. In this alternative configuration, a road corresponding to the already-sent travel trace can be found. Thus, when the vehicle travels on the road corresponding to the already-sent travel trace, it is possible to prevent the above-described steps (e.g., determining that there is a new road, sending the new road information to the information center 21) from being performed.

A reason why the travel trace information (new road information) associated with traveling on the new road is sent to the information center 21 only after the count of generation of the travel trace become equal to or greater than the predetermined value is as follows. From viewpoint of detection accuracy of the travel trace etc., there is a possibility of detecting the travel trace that does not coincide with actual shape and place of the new road. In this regard, when the same travel trace is detected multiple times, it is highly likely (high possibility) that the travel trace coincides with the actual shape and place of the new road. Although the predetermined value can be set to one or more, it may be preferable that the predetermined value be set to a not-too-large value (e.g., 3, 4, 5). A reason for this setting is that after the vehicle travels on the new road, it may be preferable to send the travel trace information associated with the traveling of the new road as soon as possible.

Figure 3:
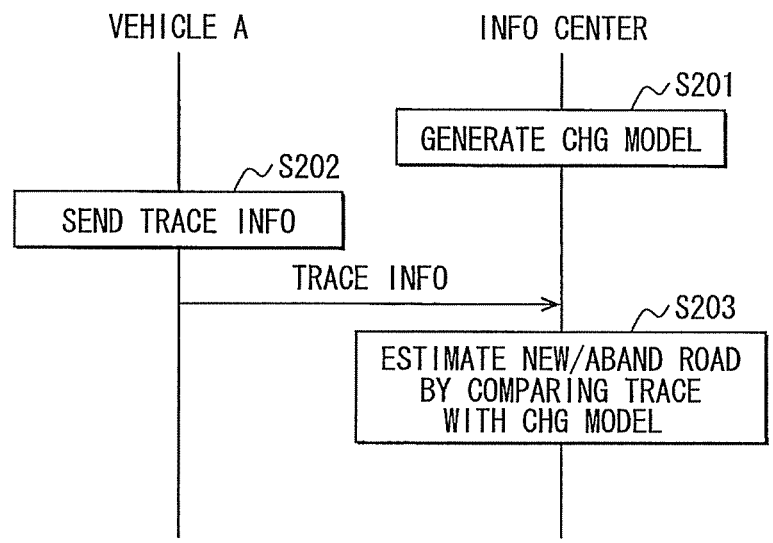
FIG. 3 is a sequence diagram illustrating an information center and a navigation apparatus.

Next, a process performed by the information center 21 and a process performed by the navigation apparatus 1 mounted to each of one or more vehicles (in the present embodiment, one vehicle is assumed) will be described with reference to FIGS. 3 to 7. FIG. 3 is a sequence diagram illustrating actions (operation) of the information center 21 and actions (operation) of the navigation apparatus 1 mounted to one vehicle A.

Figure 4:
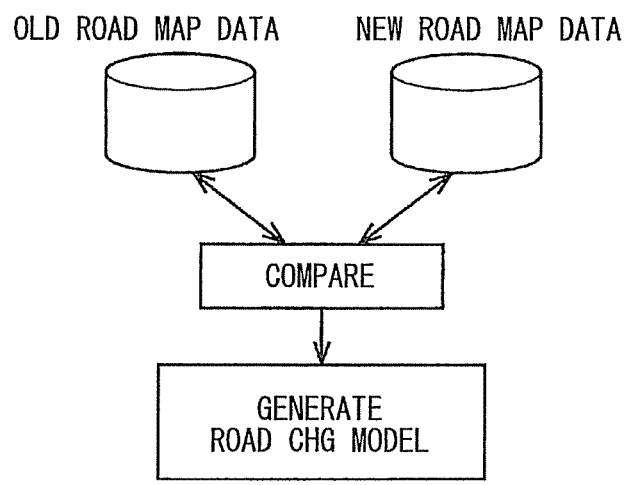
FIG. 4 is a functional block diagram illustrating a control operation of an information center.

As shown in S201 in FIG. 3, the information center 21 (corresponding to a model generation device or means) performs a process of generating a road change model in advance. In the process of generation a road change model, as shown in FIG. 4, the information center 21 compares an old road map data, which was used in past, with a latest road map data (also called a new road map data and a second road map data), which has been updated most recently. Thereby, the information center 21 extracts many road change parts in which an abandoned road and a new road are present. Based on the abandoned road and the new road, the information center 21 generates multiple road generation models and stores the multiple road generation models in the database 24. The new road map data that is compared with the old road map data in the generation of the road change model may be the latest road map data that has been updated most recently. However, the new road map data that is compared with the old road map data in the generation of the road change model may be a road map data that was updated after the old road map data.

The information center 21 has multiple versions of the road map data, which includes old versions of the road map data (multiple generations) and a currently-used new version of the road map data. The information center 21 is configured to regularly update the road map data as a whole. A process of updating the road map data is performed based on information on an abandoned road and a newly-constructed road. The information on an abandoned road and a newly-constructed road may be provided from an outside of the information center 21 (e.g., a road map data manufacturing company, a government office managing a road, and the like) or may be generated in the information center 21 as described later.

Figure 5A:
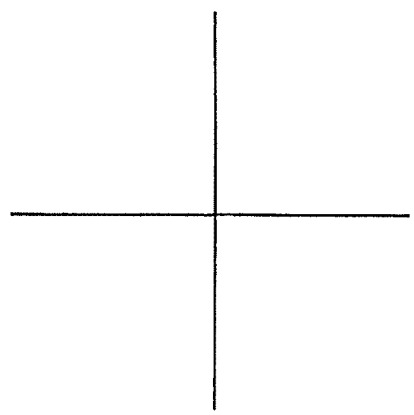
FIGS. 5A to 5C are diagrams for explaining one example of road change model.
Figure 5B:
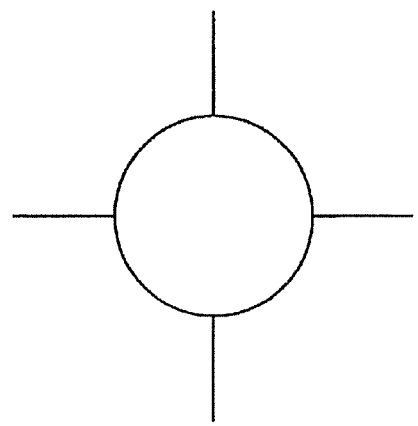
Figure 5C:
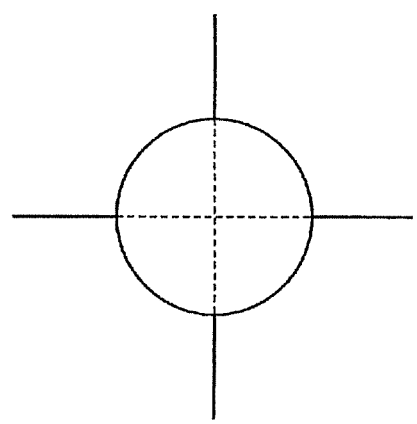

One example of the road change model is shown in FIGS. 5A to 5C. In the old road map data, a certain intersection is a cross road as illustrated in FIG. 5A. In the new road map data, this certain intersection is changed to a rotary intersection (a roundabout) as illustrated in FIG. 5B. The road change model for this certain intersection can be illustrated in FIG. 5C. In this road change model, the roundabout road depicted by the solid line represents the new road, and the crossroad depicted by the dashed line represents the abandoned road.

In the road change model, not only the new road and the abandoned road but also roads before and after the new road (a road before the new road and a road after the new road) and roads before and after the abandoned road are stored as a set. When the roads before and after the new or abandoned road are stored as a set in this way, it is possible to increase determination accuracy in layout comparison (matching) between a travel trace and a road change model.

Figure 6A:
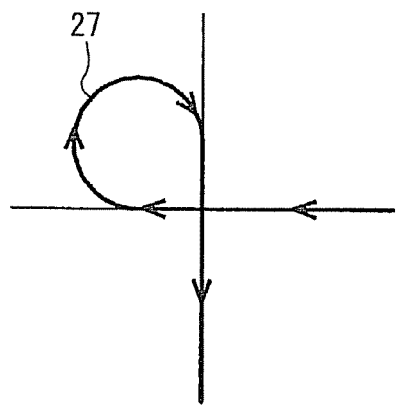
FIGS. 6A to 6C are diagrams for explaining another example of road change model.
Figure 6B:
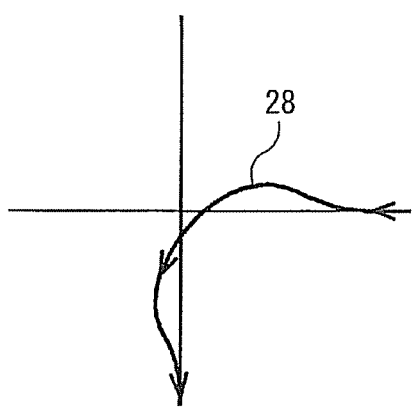
Figure 6C:
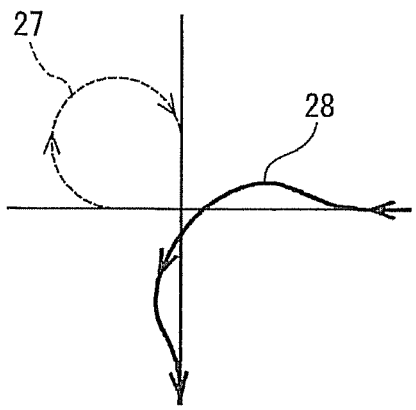

FIGS. 6A to 6C illustrate another example of the road change model. In the old road map data, a cross road in an expressway is an annular fork 27 with a small curvature radius, as shown FIG. 6A. In the new road map data, this cross road is changed to an ark-like fork 28 with a large curvature radius, as shown in FIG. 6B. In this case, the road change model of this cross road can be illustrated in FIG. 6C. In the road change model, the fork 28 depicted by the solid line represents the new road, and the fork 27 depicted by the dashed line represents the abandoned road. In the road change model illustrated in FIG. 6C, the new road and the road before and after the new road, and the abandoned road and the roads before and after the abandoned road are stored as a set.

In the foregoing, two examples of the road change models are described. Actually, many kinds of road change model are generated and stored in the database 24. In the road change models other than the two examples, the new road and the roads before and after the new road, and the abandoned road and the roads before and after the abandoned road are stored as a set.

Explanation returns to FIG. 3. When the navigation apparatus 1 of the vehicle A determines that the count of generation of the travel trace associated with the traveling of the new road becomes greater than or equal to the predetermined value, the navigation apparatus 1 performs a control operation at S202 in FIG. 3 to send the travel trace information (new road information) associated with the traveling of the new road to the information center 21.

Figure 7A:
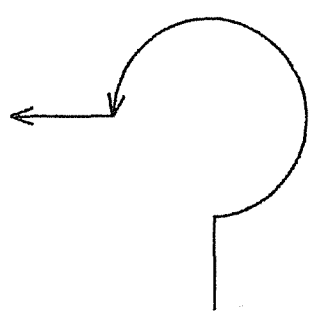
FIG. 7A to 7C are diagrams for explaining estimation of a new road and an abandoned road.
Figure 7B:
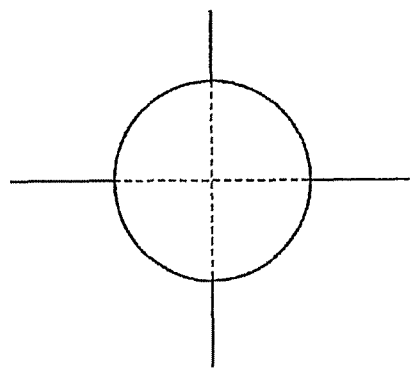
Figure 7C:
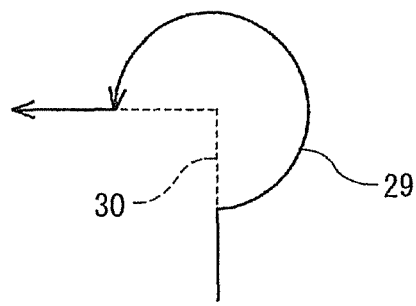

Subsequently, when the information center 21 receives the travel trace information (new road information) associated with the traveling of the new road from the navigation apparatus 1 of the vehicle A, the information center 21 performs S203 illustrated in FIG. 3. At S203, the information center 21 (corresponding to an estimation device or means) performs a new old road estimation process. Specifically, the information center 21 compares the received travel trace information with various road change models in the database 24 and selects the road change model that corresponds to the received travel trace. For example, when shape of the received travel trace is that illustrated in FIG. 7A, the road change model with the shape illustrated in FIG. 7B is selected. Then, based on the received travel trace (see FIG. 7A) and the road change model (FIG. 7B), the information center 21 estimates a new road 29 illustrated as the solid line in FIG. 7C and an abandoned road 30 illustrated as the dashed line in FIG. 7C, and stores the estimated information (information on the new road 29 and the abandoned road 30) in the database 24.

To the information center 21, the navigation apparatuses 1 of other multiple vehicles (not shown) also send the travel trace information (new road information) associated with the traveling of the new road. Then, when the information center 21 receives the travel trace information from other multiple vehicles, the information center 21 selects the road change model corresponding to the received travel trace, estimates the new road and the abandoned road, and stores the information on these estimated new road and abandoned road in the database 24, as described above.

Additionally, in the information center 21, the estimated new road and abandoned road are reflected in a process of updating the road map data stored in the information center 21. In the updating process, the road map data as a whole may be updated. Alternatively, for only a portion to be updated, the latest road map data, which has been updated most recently, may be updated.

As can be seen the above, since the present embodiment estimates the new road and the abandoned road with use of the road change model, it is possible to estimate the road that meets an actual road situation. Additionally, because of the use of the road change model, the present embodiment can provide a system that can perform road updating at low cost as compared with a conventional one. Furthermore, since the information center 21 acquires the latest road information (new road and abandoned road) from multiple vehicles, the information center 21 can have (or update, store) a latest road map data without waiting for the update provided from an outside of the information center 21 (e.g., road map data manufacturing company, a government office managing a road, etc.).

Second Embodiment

A second embodiment is described with reference to FIGS. 8 to 10B. Between the first embodiment and the second embodiment, like references are used to refer to like parts and steps. Now, a process performed by the information center 21 and a process performed by the navigation apparatus 1 of each of multiple vehicles (two vehicle are assumed) will be described.

Figure 8:
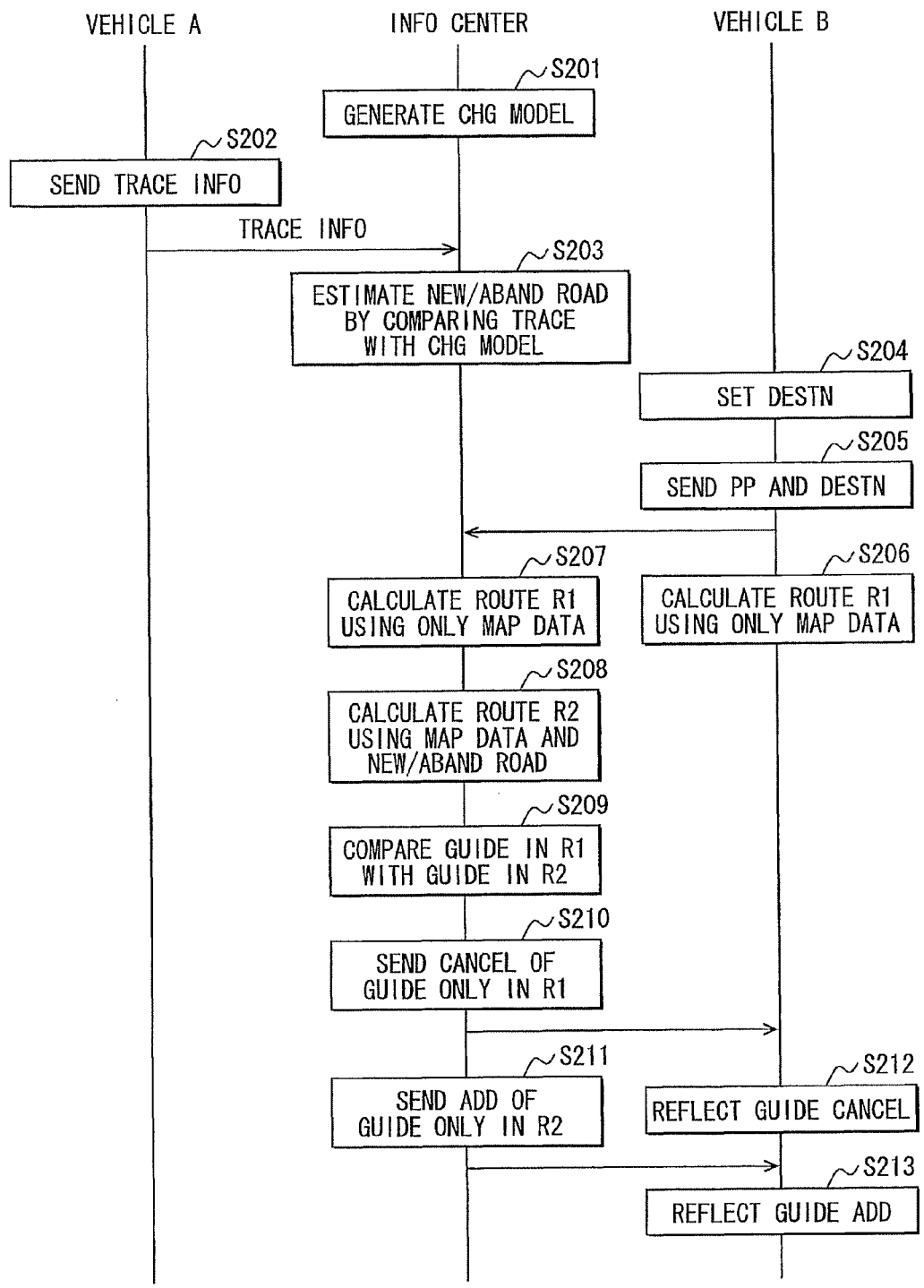
FIG. 8 is a sequence diagram illustrating operations of an information center and a navigation apparatus of a second embodiment.

As shown in FIG. 8, at S201, the information center 21 (corresponding to a model generation means and device) performs the process of generating the road change model in advance, as is the case in the first embodiment.

When the navigation apparatus 1 of the vehicle A determines that the count of generation of the travel trace associated with the traveling of the new road becomes greater than or equal to the predetermined value, the navigation apparatus 1 performs the control operation at S202 in FIG. 8 to send the travel trace information (new road information) associated with the traveling of the new road to the information center 21. The control operation at S202 in FIG. 8 can be substantially the same as that in the first embodiment.

Subsequently, when the information center 21 receives the travel trace information (new road information) associated with the traveling of the new road from the navigation apparatus 1 of the vehicle A, the information center 21 (corresponding to an estimation device or means) performs the new old road estimation process at S203 in substantially the same way as in the first embodiment. The information center 21 thereby estimates the new road and the abandoned road and stores the estimated information (information on the new road and the abandoned road) in the database 24. Then, when the information center 21 receives the travel trace information from the navigation apparatuses of other multiple vehicles, the information center 21 selects the road change model corresponding to the received travel trace, estimates the new road and the abandoned road, and stores the information on the estimated new road and abandoned road in the database 24.

Thereafter, at S204 in FIG. 8, the navigation apparatus 1 of the vehicle B sets a destination point in order to perform a route calculation process and a route guidance process. Thereafter, at S205, the navigation apparatus 1 of the vehicle B performs a sending process of sending information on the destination point and the present position of the vehicle B (or a departure point) to the information center 21. Additionally, after the sending process, the navigation apparatus 1 of the vehicle B calculates a route R1 from the present position to the destination point by using a road map data (first road map data) equipped in the navigation apparatus 1. Then, the navigation apparatus 1 of the vehicle B performs a guidance information calculation process based on: the calculated route R1; a road shape data, intersection position information and railroad crossing position information stored in the road map data; and the like. The above guidance information calculation process calculates guidance information including a point for guidance instruction; and contents of guidance (navigation) instruction such as instructions to make a right turn, left turn and the like.

Next, when the information center 21 receives the information on the destination point and the present position of the vehicle B (or the departure point) from the navigation apparatus 1 of the vehicle B, the information center 21 performs S207. At S207, the information center 21 calculates a route R1 from the present position to the destination point by using the road map data stored in the database 24, where this road map data stored in the database 24 is the same as the road map data equipped in the navigation apparatus 1 of the vehicle B and is also called herein the first road map. Then, the information center 21 performs a guidance information calculation process based on: the calculated route R1; a road shape data, intersection position information, railroad crossing position information stored in the road map data; and the like. The above guidance information calculation process calculates guidance information including: a point for guidance instruction; and contents of guidance instruction such as instructions to make a right turn, left turn and the like.

Subsequently, at S208, the information center 21 calculates a route R2 from the present position to the departure point by using (i) the first road map data stored in the database 24 and (ii) a second road map data stored in the database 24. In the above, the first road map data is the same as the road map data equipped in the navigation apparatus 1 of the vehicle B. The second road map data reflects the information on the estimated new road and abandoned road. Specifically, the second road map data is a map road map data that reflects the information on the estimated new road and abandoned road with respect to the first road map data. Thereafter, based on: the calculated route R2, a road shape data, intersection position information and railroad crossing position information stored in the second road map data; and the like, the information center 21 performs the guidance information calculation process of calculating guidance information including a point for guidance instruction and contents of guidance instruction such as instructions to make a right turn, left turn and the like. In the above, the calculated route R2 may be the substantially the same route as the calculated route R1. The route R2 may differ from the route R1 in that when the estimated abandoned route is in the route R1, the route R2 passes through the estimated new road. In the above example of the calculation of the route R2, the second road map data is the road map data reflecting the estimated new road and abandoned road with respect to the first road map data. Alternatively, the second road map data may be the road map data that was updated after the first road map data.

At S209, the information center 21 performs a route guidance comparison process, which includes comparing the guidance information of the route R1 with the guidance information of the route R2 and thereby extracting a difference between the guidance information of the route R1 and the guidance information of the route R2. Then, at S210, the information center 21 sends guidance information cancellation information to the navigation apparatus 1 of the vehicle B, where the guidance information cancellation information is provided for cancellation of the guidance information that is present in the route R1 but is absent the route R2. Specifically, the guidance instruction cancellation information includes information for cancellation of guidance instruction.

Further, at S211, the information center 21 sends guidance information addition information to the navigation apparatus 1 of the vehicle B, where the guidance information addition information is provided for addition of the guidance information that is not present in the route R1 but is present in the route R2. Specifically, the guidance information addition information includes information for addition of the guidance information of the new road.

Upon receipt of the guidance information cancellation information from the information center 21, the navigation apparatus 1 of the vehicle B performs S211. At S212, based on the received guidance information cancellation information, the navigation apparatus 1 incorporates the cancellation of the guidance information into the guidance information of the route R1, that is, the navigation apparatus 1 cancels the corresponding guidance instruction.

Upon receipt of the guidance information addition information from the information center 21, the navigation apparatus 1 of the vehicle B performs S213. At S213, based on the received guidance information addition information, the navigation apparatus 1 performs a process of incorporating the addition of the guidance information into the guidance information of the route R1. For example, the navigation apparatus 1 performs a process of adding the corresponding guidance instruction or displaying a guidance map for simply displaying a new map and a new road. As a result, the navigation apparatus 1 of the vehicle B can perform route guidance by using the guidance information that is the same as the guidance information of the route R2 calculated in the information center 21. In other words, the navigation apparatus 1 of the vehicle B can perform route guidance in the route passing through the new road.

In the present embodiment, the travel trace associated with the traveling of the new road not present in the road map data is accumulated in the memory device of the navigation apparatus 1 of the vehicle A. Upon satisfaction of the predetermined condition, the travel trace information of the new road is sent to the information center 21. Thereafter, the information center 21 receives the travel trace information of the new road from the navigation apparatus 1 of the vehicle A, and compares the received travel trace information of the new road with the database 24, thereby estimating the new road and the abandoned road. Because of the above configuration of the present embodiment, the information center 21 can accurately estimate the abandoned road and the new road which are not present in the road map data.

Additionally, in the present embodiment, the information center 21 receives the information on the destination point and the present position of the vehicle B (departure point) from the navigation apparatus 1 of the vehicle B, and calculates the route R1 from the present position (departure point) to the destination point by using the road map data stored in the database 24 (this road map data is the same as the road map data equipped in the navigation apparatus 1 of the vehicle B). The information center 21 further performs a process (guidance information calculation process) of calculating a point for guidance instruction and contents of guidance instruction from the following: the calculated guidance route R; the road shape data, the intersection position information, the railroad crossing position information and the like stored in the road map data; and the like. Furthermore, the information center 21 performs a process of calculating the route R2 from the present position (departure point) to the destination point by using (i) the road map data (that is the same as the road map data equipped in the navigation apparatus 1 of the vehicle B) and (ii) the information on the estimated new road and abandoned road. Additionally, the information center 21 performs a process (guidance information calculation process) of calculating a point need for guidance instruction and calculating content of the guidance instruction, based on: the calculated route R2; the road shape data, the intersection position information, the railroad crossing position information etc. stored in the road map data; and the like. In the above, when the calculated route R2 has the estimated new road, the route R2 goes through the estimated new road. Additionally, the information center 21 performs a process (route guidance comparison process) of comparing the guidance information of the route R1 with the guidance information of the route R2 and extracting a difference between the guidance information of the route R1 and the guidance information of the route R2. Thereafter, the guidance information cancellation information is sent to the navigation apparatus 1 of the vehicle B, where the guidance information cancellation information is provided for cancellation of the guidance information that is present in the route R1 but not present in the route R2. The guidance information addition information is sent to the navigation apparatus 1 of the vehicle B, where the guidance information addition information is provided for addition of the guidance information that is not present in the route R1 but present in the route R2. Additionally, upon receipt of the guidance information cancellation information and the guidance information addition information from the information center 21, the navigation apparatus 1 of the vehicle B incorporates the calculation of the guidance instruction and the addition of the guidance instruction into the guidance instructions in the route R1 based on the received guidance information cancellation information and guidance information addition information. As a result, the navigation apparatus 1 of the vehicle B can perform the route guidance using the guidance information that is the same as the guidance information of the route R2 calculated in the information center 21. In other words, the navigation apparatus 1 of the vehicle B can perform the route guidance in the route that passes through the new road not present in the road map data.

In the above example, the guidance instruction in the route is illustrated as the guidance information. Alternatively, the guidance information may include a road map data. The guidance information may include the guidance instruction in the route and the road map data.

Specifically, in sending the guidance information including both of the guidance instruction in the route and the road map data to the navigation apparatus 1, the information center 21 may incorporate the following information in the guidance information cancellation information. The incorporated information includes (i) the cancellation of the guidance instruction and (ii) an area in which map display and route display are prohibited. This prohibiting area is used to mask (preventing display of) an old map and an abundance road when a map, a route or the like is displayed on a display of the navigation apparatus 1. At S211, the information center 21 sends the guidance information addition information to the navigation apparatus 1 of the vehicle B, where the guidance information addition information is provided for addition of the guidance information that is not present in the route R1 but is present in the route R2. The guidance information addition information includes the guidance information in the new road and information on a guide map. The information on a guide map includes, for example, a road data such as road illustration, image and the like for simply displaying a new map and a new road. As the information on the guide map, the information center 21 sends image data and code information. In this regard, if this image data is stored in the navigation apparatus 1, the information center 21 may send information for identification of the image data.

Upon receipt of the guidance information cancellation information from the information center 21, the navigation apparatus 1 of the vehicle B performs S212. At S212, based on the received guidance information cancellation information, the navigation apparatus 1 reflects the cancellation of the guidance information to the guidance information of the route R1. In other words, the navigation apparatus 1 cancels the corresponding guidance instruction or performs masking to prevent display of the old map and the abandoned road.

Figure 9A:
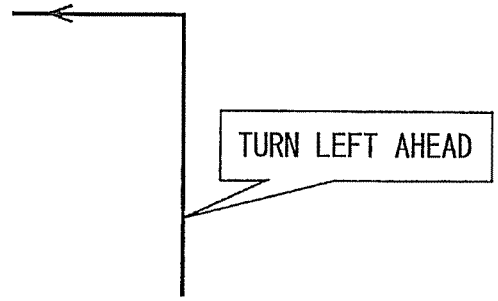
FIG. 9A is a diagram illustrating one example of canceled guidance information.
Figure 9B:
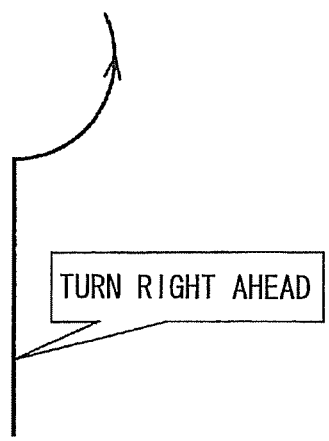
FIG. 9B is a diagram illustrating one example of added guidance information.

Additionally, upon receipt of the guidance information addition information from the information center 21, the navigation apparatus 1 of the vehicle B performs S213. At S213, based on the received guidance information addition information, the navigation apparatus 1 reflects the addition of the guidance information to the guidance information of the route R1. In other words, the navigation apparatus 1 adds the corresponding guidance instruction and displays the guidance map for simply displaying the new map and the new road. As a result, the navigation apparatus 1 of the vehicle B can perform route guidance by using the guidance information that is the same as the guidance information of the route R2 calculated in the information center 21. In other words, the navigation apparatus 1 of the vehicle B can perform route guidance in the route passing through the new road. In the above, the guidance map for simply displaying the new map and the new road may not be sent; and only the old road may be masked FIGS. 9A and 9B illustrate one example of the cancellation and addition of the guidance information, which includes both of a guidance instruction and a road map data in a route. In this example, the guidance information of the abandoned road as illustrated in FIG. 9A is cancelled. Specifically, a message "turn left ahead" is cancelled, and additionally, display of a map of a left-turn road (abandoned road) and therearound is prohibited (masked). Furthermore, the guidance information of the new road as illustrated in FIG. 9B is added. Specifically, a message "turn right ahead" is added, and additionally, a map of a right-turn round road (new road) and therearound is displayed. In the above, a message "turn right ahead" may be incorporated into image information of the guidance map.

Figure 10A:
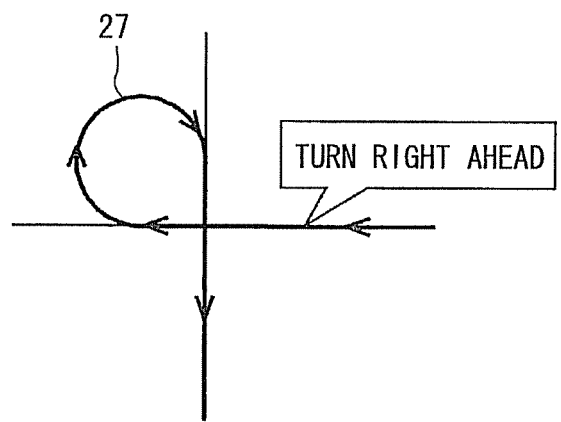
FIG. 10A is a diagram illustrating another example of canceled guidance information.
Figure 10B:
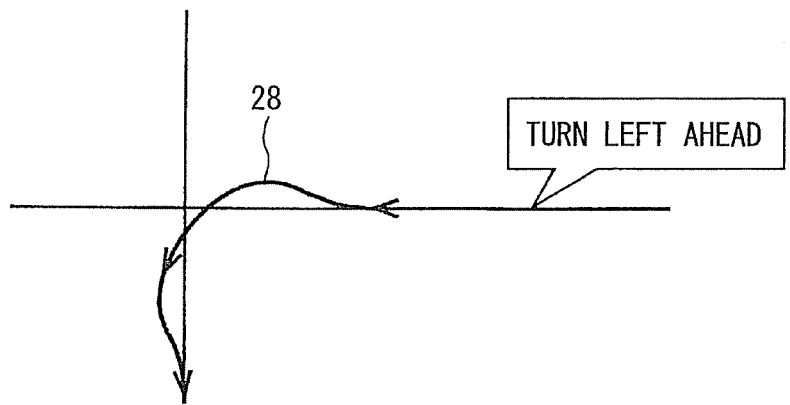
FIG. 10B is a diagram illustrating another example of added guidance information.

FIGS. 10A and 10B illustrate another example of the cancellation and addition of the guidance information. In this example, the guidance information of the abandoned road as illustrated in FIG. 10A is cancelled. Specifically, a message "turn right ahead" is cancelled, and additionally, display of a map of an annular fork 27 (abandoned road) and therearound is prohibited (masked). Furthermore, the guidance information of the new road as illustrated in FIG. 10B is added. Specifically, a message "turn right ahead" is added, and additionally, an ark-like fork 28 with a large curvature radius (new road) and therearound is displayed. In the case of FIGS. 10A and 10B, although the message contents of the guidance instruction is the same, a point at which the message is outputted is different. That is, the point for guidance instruction is different. In the above, a message "turn right ahead" may be incorporated into image information of the guidance map.

The second embodiment premises the road information updating process that uses the road change model of the first embodiment. However, this does not limit the road information updating process. Other known road information updating processes (e.g., a process of updating a road map data as a whole or in part) may be used.

Third Embodiment

A third embodiment will be described with reference to FIGS. 11 to 19. In the first, second and third embodiments, like references are used to refer to like parts and steps. The third embodiment illustrates one example of a model generation device 31, which generates many kinds of road change model used in the first and second embodiment. The model generation device 31 of the present embodiment includes, for example, the server 23 and the database 24 of the information center 21.

Figure 11:
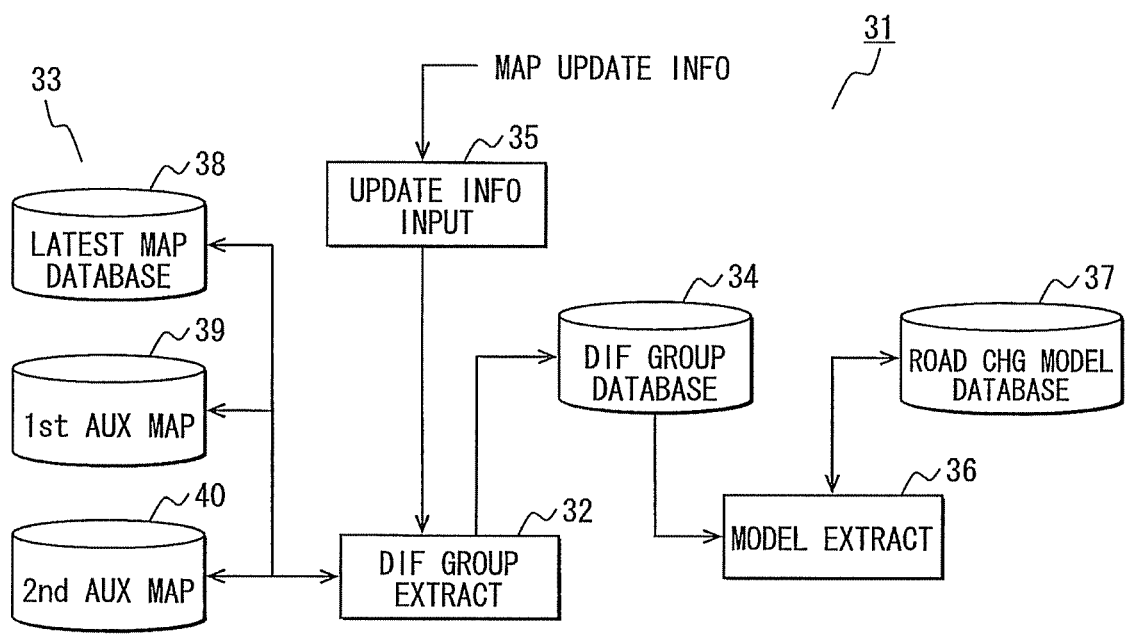
FIG. 11 is a functional block diagram illustrating a model generation device of a third embodiment.

As shown in FIG. 11, the model generation device 31 includes a difference group extraction portion 32 (corresponding to a difference group generation portion or means), a map database group 33, a difference group database 34 (difference group storage portion or means), a map update information input portion 35, a model extraction portion 36 (model extraction portion or means), and a road change model database 37 (model storage portion or means). The difference group extraction portion 32, the map update information input portion 35 and the model extraction portion 36 are included in the server 23 of the information center 21. The map database group 33, the difference group database 34 and the road change model database 37 are included in the database 24 of the information center 21.

The difference group extraction portion 32 has a function to group road changes so that each extracted group becomes minimum ensuring a road network. In the above, the road change may be such a change as road addition, road modification, road deletion and the like. The map database group 33 includes a latest map database 38, a first auxiliary map database 39, and a second auxiliary map database 40. The difference group database 34 stores many difference groups extracted by the difference group extraction portion 32. The model extraction portion 36 stores various (many) road change models extracted (or corrected) by the model extraction portion 36.

The map update information input portion 35 receives map update information, which may instruct addition of a link to the map data or deletion of a link from the map data. For example, in accordance with opening of a road or a closing of a road, an operator (worker) may input the map update information to the map update information input portion 35 by manipulating an input device such as a keyboard, a mouse and the like (not shown).

The latest map database 38 stores a latest map data, which includes information on how nodes and links are connected. The note represents an intersection (intersecting point). The link represents a road between nodes. The link further includes information on a direction in which vehicles are allowed to travel. When the map update information instructing the link addition is inputted to the map update information input portion 35 in accordance with the opening of a road, the difference group extraction portion 32 incorporates the link addition into the latest map data stored in the latest map database 38. When the map update information instructing the link deletion is inputted to the map update information input portion 35 in accordance with the closing of a road, the difference group extraction portion 32 incorporates the link deletion into the latest map data stored in the latest map database 38. That is, when any one of a map update instructing the link addition and a map update instructing the link deletion occurs, the latest map data stored in the latest map database 38 is updated In an initial state (i.e., a state where a map data is registered in the first auxiliary map database 39), the first auxiliary map database 39 stores, as a first auxiliary map data, the map data that is the same as the latest map data stored in the latest map database 38. When the map update information instructing the link deletion is inputted to the map update information input portion 35, the difference group extraction portion 32 incorporates the link deletion into the first auxiliary map data stored in the first auxiliary map database 39. However, when the map update information instructing the link addition is inputted to the map update information input portion 35, the difference group extraction portion 32 does not incorporate the link addition in the first auxiliary map data stored in the first auxiliary map database 39. In other words, only when the map update instructing the link deletion occurs, the first auxiliary map data stored in the first auxiliary map database 39 is updated, and when the map-updating instructing the link addition occurs, the first auxiliary map data stored in the first auxiliary map database 39 is not updated.

In an initial state (i.e., a state where a map data is registered in the second auxiliary database 40), the second auxiliary map database 40 stores, as the second auxiliary map data, the map data that is the same as the latest map data stored in the latest map database 38. When the map update information instructing the link addition is inputted to the map update information input portion 35, the difference group extraction portion 32 incorporates the link addition into the second auxiliary map data stored in the second auxiliary map database 40. However, when the map update information instructing the link deletion is inputted to the map update information input portion 35, the difference group extraction portion 32 does not incorporate the link deletion into the second auxiliary map data stored in the he second auxiliary map database 40. In other words, the second auxiliary map data stored in the he second auxiliary map database 40 is updated only in response to occurrence of the map data instructing the link addition, and is not updated in response to occurrence of the map data instructing the link deletion.

As described above, the first auxiliary map data stored in the first auxiliary map database 39 and the second auxiliary map data stored in the he second auxiliary map database 40 have the opposite properties. Since the first auxiliary map data is updated in response to the map update instructing the link deletion, i.e., in response to the map update for decreasing a route where vehicles are allowed to travel, the first auxiliary map data reflects only the map update disadvantageous to a user. Meanwhile, since the second auxiliary map data is updated in response to only the map update instructing the link addition, i.e., in response to the map update for increasing the route where vehicles are allowed to travel, the first auxiliary map data reflects only the map update advantageous to a user.

Figure 12:
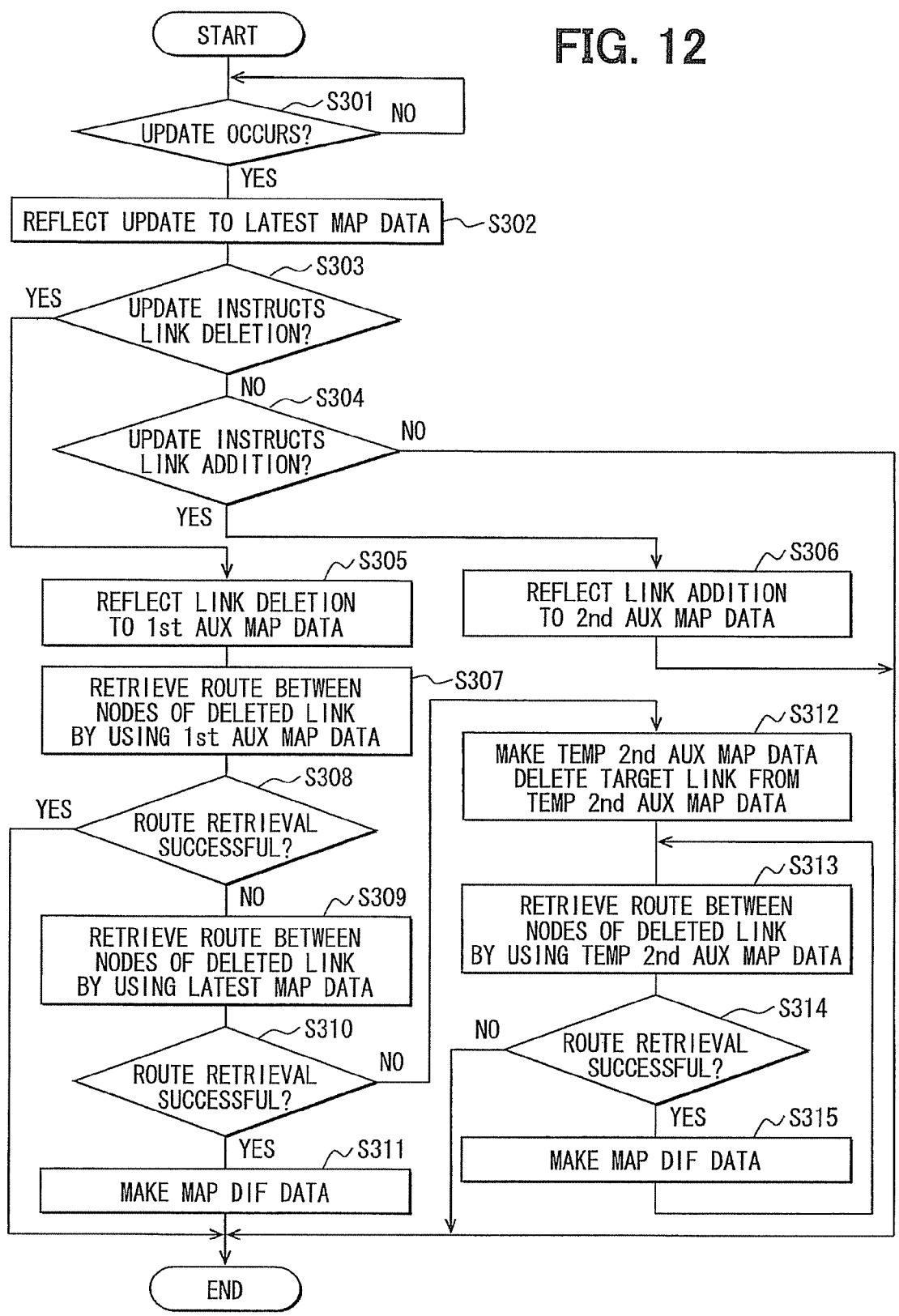
FIG. 12 is flowchart illustrating a control operation of a difference group extraction device.

A difference group extraction process performed by the difference group extraction portion 32 will be described with reference to FIGS. 12 to 16. As shown in FIG. 12, at S301, the difference group extraction portion 32 determines whether or not the map update information is inputted to the map update information input portion 35, and determines whether or not the map data occurs. For example, when the difference group extraction portion 32 determines, in response to, for example, the operator's operation of the input device or the like, that the map data update information is inputted to the map data update information input portion 35 and that the map data occurs (YES at S301), the process proceeds to S302. At S302, the difference group extraction portion 32 incorporates contents of the map update into the latest map data stored in the latest map database 38. In other words, the difference group extraction portion 32 incorporates the link addition into the latest map data in response to the map update instructing the link addition or incorporates the link deletion into the latest map data in response to the map update instructing the link deletion.

Thereafter, at S303 and S304, the difference group extraction portion 32 determines whether or nor the map update is the map update instructing the link addition or the map update instructing the link deletion. When the difference group extraction portion 32 determines that the map update is the map update instructing the link deletion (YES at S303), the process proceeds to S305. At S305, the difference group extraction portion 32 incorporates the link deletion into the first auxiliary map data stored in the first auxiliary map database 39. In the above case, the difference group extraction portion 32 does not incorporate the link deletion into the second auxiliary map data stored in the second auxiliary map database 40.

When the difference group extraction portion 32 determines that the map update is the map update instructing the link addition (YES at S304), the process proceeds to S306. At S306, the difference group extraction portion 32 incorporates the link addition into the second auxiliary map data stored in the second auxiliary map database 40. In the above case, the difference group extraction portion 32 does not incorporate the link addition into the first auxiliary map data stored in the first auxiliary map database 39.

After the difference group extraction portion 32 incorporates the link deletion into the first auxiliary map data, the process proceeds to S307. At S307, the difference group extraction portion 32 performs route retrieval between nodes located at ends of the deleted link, by using the first auxiliary map data stored in thee first auxiliary map database 39, that is, by using the first auxiliary map data reflecting (incorporating) the link deletion. At S308, the difference group extraction portion 32 determines whether or not the route retrieval using the first auxiliary map data is successful. When the difference group extraction portion 32 determines that the route retrieval using the first auxiliary map data is successful (corresponding to YES at S308), this difference group extraction process is ended.

When the difference group extraction portion 32 determines that the route retrieval using the first auxiliary map data is unsuccessful (NO at S308), the process proceeds to S309. At S309, the difference group extraction portion 32 performs the route retrieval between the nodes located at the ends of the deleted link, by using the latest map data, which is latest at this time point, stored in the latest map database 38. At S310, the difference group extraction portion 32 determines whether or not the route retrieval using the latest map data is successful.

When the difference group extraction portion 32 determines that the route retrieval using the latest map data is successful (YES at S310), the process proceeds to S311. At S311, the difference group extraction portion 32 determines that there is a dependency relation among contents of the map updates occurring from the latest map data at the initial state to the latest map data at the present time. Additionally, the contents of the map updates having the dependency relation are grouped as a map difference data. Thereafter, this difference group extraction process is ended.

When the difference group extraction portion 32 determines that the route retrieval using the latest map data is unsuccessful (NO at S310), the process proceeds to S312. At S312, the difference group extraction portion 32 copies the second auxiliary map data to generate a temporal second auxiliary map data and deletes a target link from the temporal second auxiliary map data. At S313, the difference group extraction portion 32 performs the route retrieval between the nodes located at the ends of the target link by using the temporal second auxiliary map data. At S314, the difference group extraction portion 32 determines whether or not the route retrieval using the temporal second auxiliary map data is successful.

When the difference group extraction portion 32 determines that the route retrieval using the temporal second auxiliary map data is successful (YES at S314), the process proceeds S315. At S315, the difference group extraction portion 32 determines that there is a dependency relation between the target link and the update link contained in the successfully-retrieved route. Additionally, the contents of the map updates determined as having the dependency relation are grouped as the map difference data, and the update link contained in the successfully-retrieved route is deleted from the temporal second auxiliary map data. Thereafter, S313 and S314 are performed again. Then, when the difference group extraction portion 32 determines that the route retrieval using the temporal second auxiliary map data is unsuccessful (NO at S314), this difference group extraction process is ended.

Concrete examples of the above process will be described with reference to FIGS. 13 to 16. In the following, two situations are illustrated. A first situation is that the map update instructing addition of a first link occurs and thereafter the map data instructing deletion of a second link occurs. A second situation is that the map update instructing deletion of a first link occurs and thereafter the map data instructing deletion of a second link occurs.

The first situation will be described.

Figure 13:
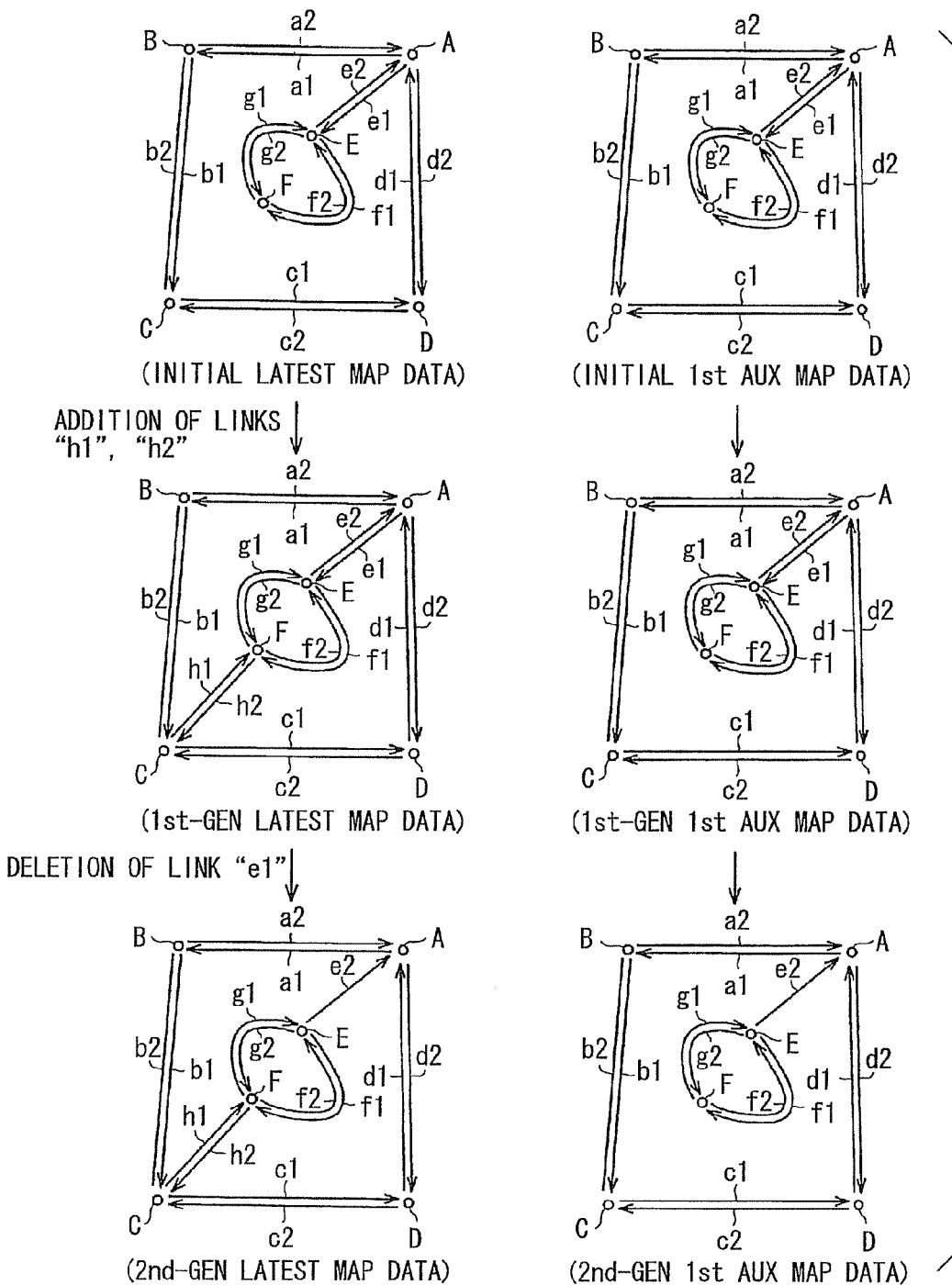
FIG. 13 is a diagram illustrating a change in latest map data and a change in first auxiliary map data.

It is assumed that in the latest map data in the initial state (also called an initial latest map data) stored in the latest map database 38, nodes A to F and links a1, a2 to g1, g2 are connected as illustrated in FIG. 13. The first auxiliary map data in the initial sate (also called an initial latest map data) stored in the first auxiliary map database 39 is the same as the latest map data in the initial state. In this state, when the map update instructing addition of links h1, h2 (corresponding to the first link) connecting the node C and the node F occurs, the difference group extraction portion 32 incorporates the addition of the links h1, h2 into the initial latest map data, thereby generating a first-generation latest map data (corresponding to a next-generation latest map data); however, the difference group extraction portion 32 does not incorporate the addition of the links h1, h2 into the initial first auxiliary map data, so that the initial first auxiliary map data is unchanged and is regarded as a first-generation first auxiliary map data (corresponding to a next-generation first auxiliary map data).

After the above state, if the map update instructing deletion of a link e1 (corresponding to a second link) connecting the node A and the node E occurs, the difference group extraction portion 32 incorporates the deletion of the link e1 into the first-generation latest map data, thereby generating a second-generation latest map data (corresponding to a next-next-generation latest map data). Additionally, the difference group extraction portion 32 incorporates the deletion of the link e1 into the first-generation first auxiliary map data, thereby generation a second-generation first auxiliary map data (corresponding to a next-next-generation first auxiliary map data).

Figure 14:
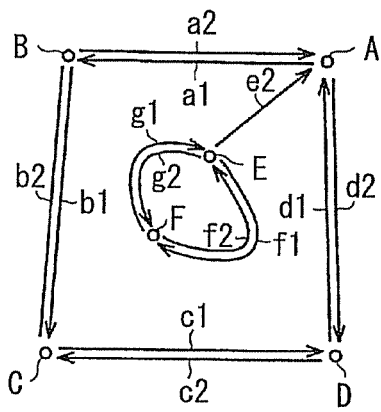
FIG. 14 is a diagram for explaining a determination as to a dependency relation.
Figure 14:
Figure 14:
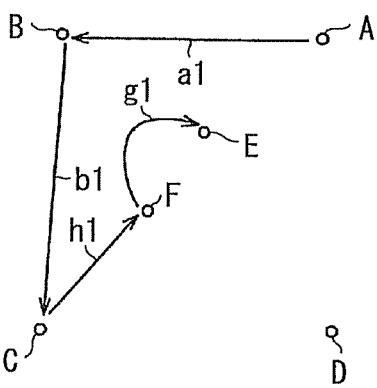
Figure 14:

Then, the difference group extraction portion 32 performs, by using the second-generation first auxiliary map data, the route retrieval from the node A (corresponding to a first node) to the node E (corresponding to a second node) located at the both ends of the deleted link e1 as illustrated in FIG. 14; however, since the addition of the links h1 and h2 is not incorporated in the second-generation first auxiliary map data as described above, the route retrieval from the node A to the node E ends in failure. Thereafter, when the route retrieval using the second-generation first auxiliary map data is unsuccessful, the difference group extraction portion 32 performs the route retrieval from the node A and the node E located at both ends of the deleted link e1 by using the second-generation latest map data. In this case, since the addition of the links h1, h2 has been incorporated into the second-generation latest map data, the route retrieval from the node A to the node E is successfully performed, and the route from the node A to the node E through the links h1 or h2 is successfully retrieved. More specifically, the route passing through the links a1, b1, h1, and g1 (or f2) is successfully retrieved.

When the route retrieval using the second-generation latest map data is successful, the difference group extraction portion 32 determines that there is a dependency relation among the contents of the map updates that have occurred from the initial latest map data to the present latest map data. Specifically, the difference group extraction portion 32 determines that there is a dependency relation between the addition of the links h1, h2 and the deletion of the link e1. Additionally, the addition of the links h1, h2 and the deletion of the link e1, which are determined as having the dependency relation, are grouped as the map difference data and stored in the difference group database 34.

In the present embodiment, in grouping and storing road changes (update) as the map difference data in the above way, the difference group extraction portion 32 adds information on an intended-use of a changed road (road intended-use). The information on a road intended-use is, for example, a connection from a main lane of a freeway to a main lane of another freeway (see FIG. 17), a right/left turn in an open road (e.g., when an intersection is changed to a roundabout), and the like. This sort of added information is added while being associated with the grouped map difference data.

Figure 15:
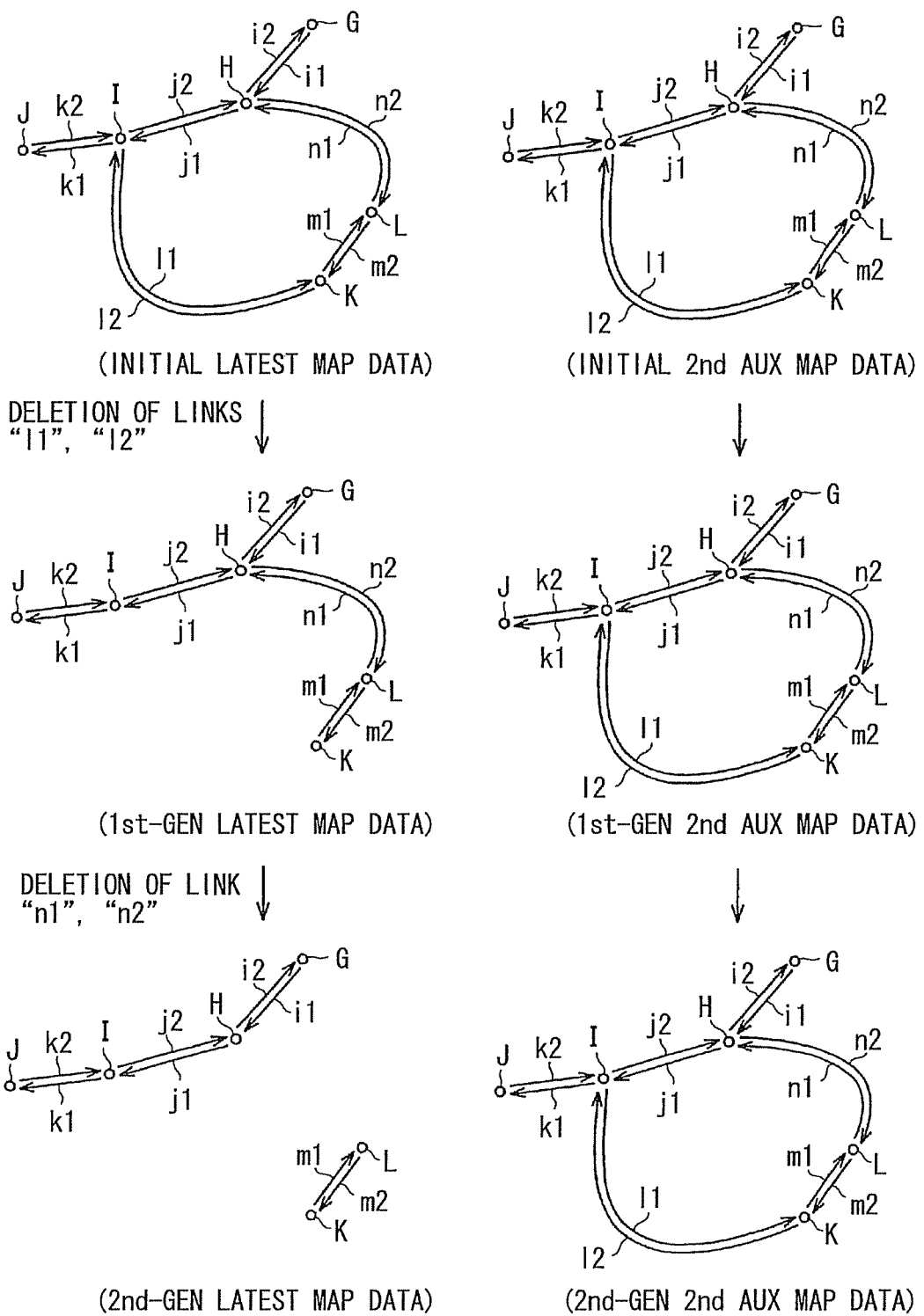
FIG. 15 is a diagram illustrating a change in latest map data and a change in second auxiliary map data.

Next, explanation will be given on the second situation where the map update instructing deletion of a first link occurs and thereafter the map update instructing deletion of a second link occurs. Now, it is assumed that in the initial latest map data stored in the latest map database 38, nodes G to L and links i1, i2 to n1, n2 are connected as illustrated in FIG. 15 and that the second auxiliary map data stored in the second auxiliary map database 40 is the same as the initial latest map data. In this state, when the map update instructing deletion of links l1, l2 (corresponding to a first link) connecting the node l and the node K occurs, the difference group extraction portion 32 incorporates the deletion of the links l1, l2 into the initial latest map data, thereby generating a first-generation latest map data (next-generation latest map data). Additionally, the difference group extraction portion 32 does not incorporate the deletion of the links l1, l2 into the initial second auxiliary map data, so that the initial second auxiliary map data is unchanged and provided as a first-generation second auxiliary map data (corresponding to a next-generation second auxiliary map data).

Thereafter, when the map update instructing deletion of the links n1, n2 (corresponding to a second link) connecting the node H and the node L occurs, the difference group extraction portion 32 incorporates the deletion of the links n1, n2 into the first-generation latest map data, thereby generating a second-generation latest map data. Additionally, the difference group extraction portion 32 does not incorporate the deletion of the links n1, n2 into the first-generation second auxiliary map data, so that the first-generation second auxiliary map data is unchanged and provided as a second-generation second auxiliary map data (corresponding to a next-next-generation auxiliary map data).

Figure 16:
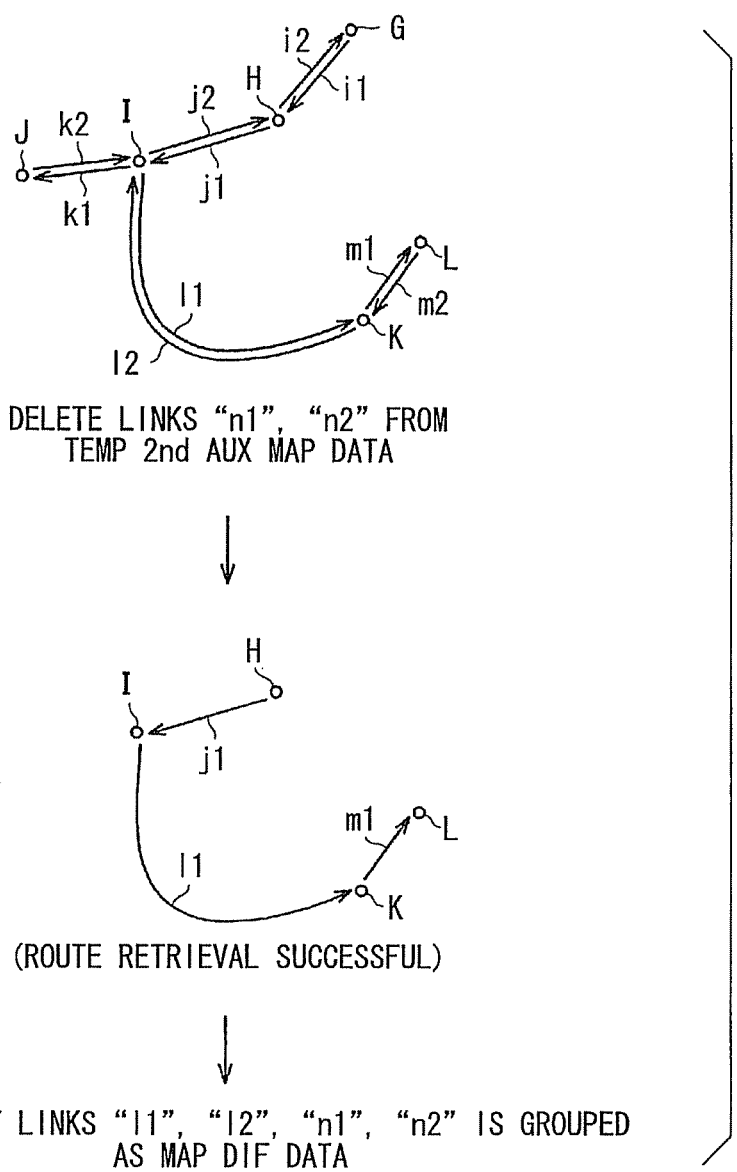
FIG. 16 is a diagram for explaining another example of determination as to a dependency relation.

Furthermore, as shown in FIG. 16, the difference group extraction portion 32 copies the second-generation second auxiliary map data, thereby generating a temporal second auxiliary map data. Then, the difference group extraction portion 32 deletes the links n1, n2 from the temporal second auxiliary map data, and performs the route retrieval from the node H (corresponding to a first node) to the node L (corresponding to a second node) by using the temporal second auxiliary map data. Note that the node H and the node L are located at the ends of the deleted links n1, n2. Since the temporal second auxiliary map data reflects the deletion of the links n1, n2 but does not reflect the deletion of the links l1, l2, the route retrieval from the node H to the node L (or from the node L to the node H) is successful. Specifically, the route passing through the links j1, l1, m1 is successfully retrieved.

The difference group extraction portion 32 then determines that there is a dependency relation between the deletion of the links l1, l2 contained in the successfully-retrieved route and the deletion of the links n1, n2. Additionally, the deletion of the links l1, l2 and the deletion of the links n1, n2, which are determined as having the dependency relation, are grouped as the map difference data and stored in the difference group database 34. In the present embodiment, when road changes (update) are grouped and stored as the map difference data in the above way, information on an intended-use of a changed road (road intended-use) is added.

As described above, in the present embodiment, every time the map update (road change such as road addition, road modification, road deletion and the like) occurs, the road changes are grouped as the map difference data and stored in the difference group database 34, that is, the difference group extraction process is sequentially performed.

According to this configuration, minimum grouping which ensures a road network can be achieved. Further, by performing this difference group extraction process, it is possible to perform a next process without incorporation of an adjacent-road change. Additionally, even if the changes are not directly connected in a road network, the data having the dependency relation as a relation of road network can be treated as a single data group.

One example of road update (road change, road modification etc.) is that a main lane is constructed so that one can easily go across the main lane by walking. This kind of road modification can be extracted by the difference group extraction process.

In the above difference group extraction process, every time the map update associated with a road change such as road addition, road modification, road deletion and the like occurs, the road change is grouped and stored as a map difference data. Alternatively, by comparing a map database version A after the map data (latest version) with an old map database version B before the map update (older than the latest version by one-generation or more), parts in which the road change is present may be extracted. Then, each road change part may be grouped and stored as the map difference data. In this configuration also, many difference groups can be extracted and stored.

Figure 17:
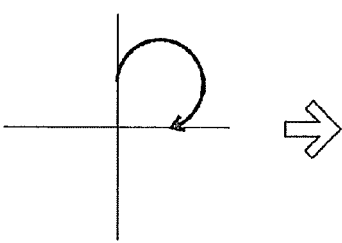
FIG. 17 is a diagram illustrating a configuration of road change model.
Figure 17:
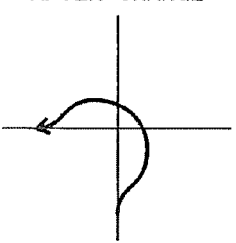
Figure 17:
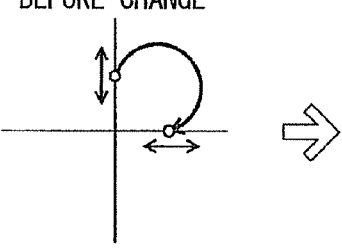
Figure 18:
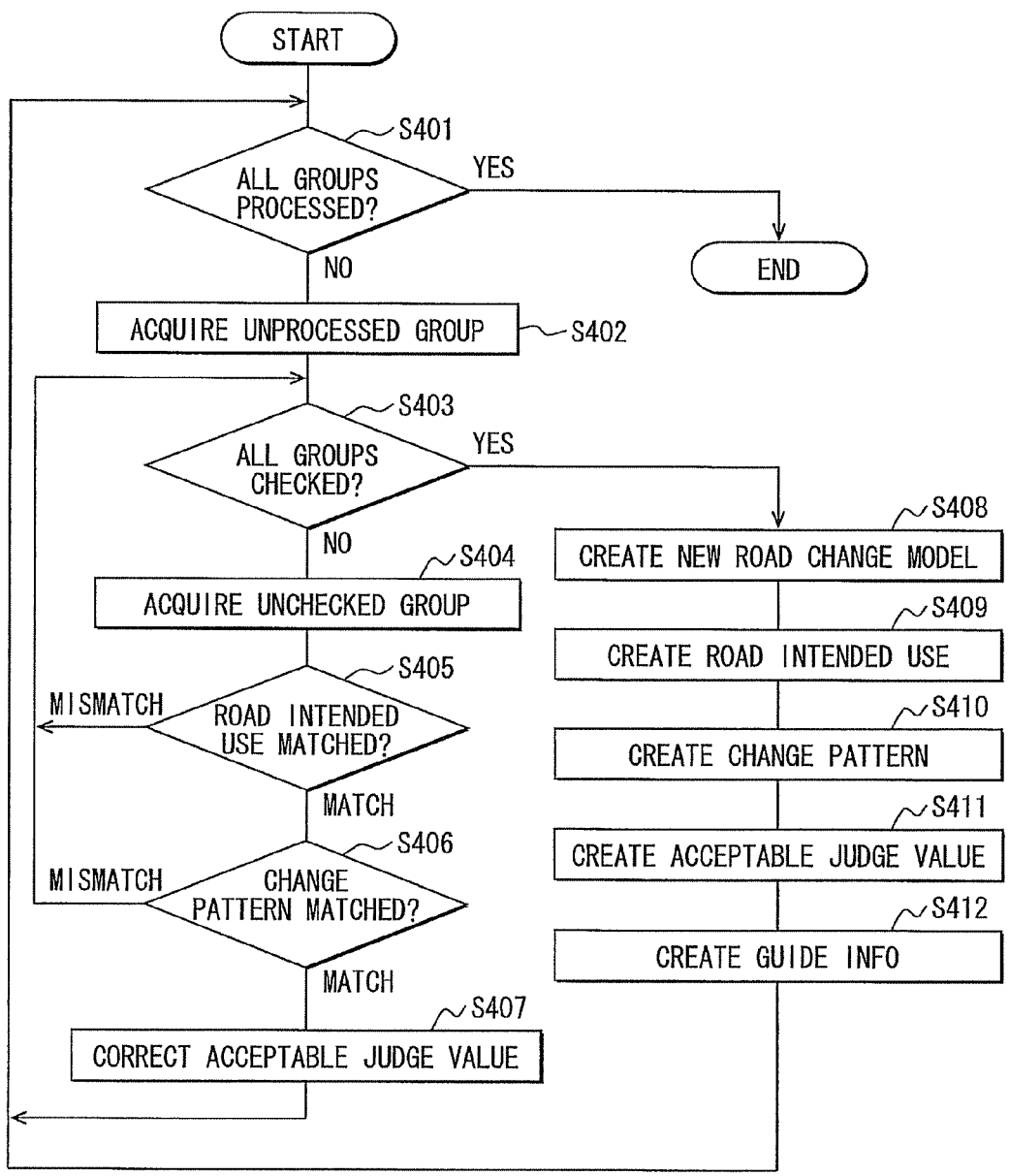
FIG. 18 is a flowchart illustrating a control operation of a model extraction portion.
Figure 19:
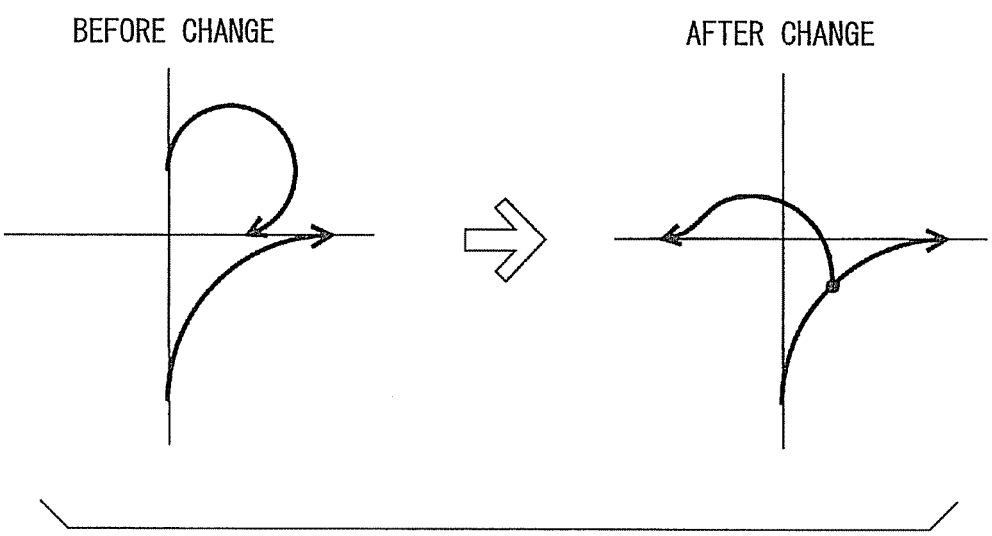
FIG. 19 is a diagram illustrating a road layout change.

Next, a process performed by the model extraction portion 36 to generate or correct the road change model will be described with reference to FIGS. 17 to 19. One example of the road change model generated by the model extraction portion 36 is shown in FIG. 17. This road change model includes a model number, a road intended-use, a road layout change (also referred to as road change pattern), an allowable judgment value, and guidance information. The model number is a number for identification of the road change model. The road intended-use indicates an intended-use of the road such as a right/left turn in an open road, a connection from a main lane of a freeway to a main lane of a freeway.

The road layout change includes a road layout (road pattern) before the change and a road layout after the change. The allowable judgment value includes information indicative of (i) a predetermined allowable displacement range of a coordinate point of a starting point of the road layout before the change, (ii) a predetermined allowable displacement range of a coordinate point of an end point of the road layout before the change, (iii) a predetermined allowable displacement range of a coordinate point of a starting point of the road layout after the change, and (iv) a predetermined allowable displacement range of a coordinate point of a starting point of the road layout after the change. The guidance information includes information for a car navigation apparatus to provide appropriate guidance when a vehicle travels the road layout after the change. For example, the guidance information includes graphic information (e.g., road image information for the changed road), a coordinate point for starting guidance, a coordinate point for ending guidance, and a guidance message. The coordinate point for starting guidance and the coordinate point for ending guidance are in allowable set displacement ranges. The coordinate point for starting guidance and the coordinate point for ending guidance are provided based on allowable judgment values. In other words, based on the allowable judgment values, the point for outputting the guidance information is adjustable.

Next, a process performed by the model extraction portion 36 will be described with reference to the flowchart of FIG. 18. At S401, the model extraction portion 36 determines whether or not all the difference groups stored in the difference group database 34 have been processed. When not all the difference groups stored in the difference group database 34 have been processed (NO at S401), the process proceeds to S402. At S402, the model extraction portion 36 acquires an unprocessed difference group from the difference group database 34. The acquired unprocessed difference group may be also called a target difference group.

Then, at S403, the model extraction portion 36 determines whether or not the acquired difference group has been checked against all the road change models (also referred to as road model patterns) in the road change model database 37.

When the acquired difference group has been checked against not all the road change models (NO at S403), the process proceeds to S404. At S404, the model extraction portion 36 extracts an unchecked road change model from the road change model database 37. The extracted unchecked road change model may also called a check-target road change model.

After S404, the process proceeds to S405. At S405, the model extraction portion 36 determines whether or not the road intended-use of the target difference group matches the road intended-use of the check-target road change model. When the road intended-use of the target difference group does not match the road intended-use of the check-target road change model (NO at S405), the process returns to S403. When the road intended-use of the target difference group matches the road intended-use of the check-target road change model (YES at S405), the process proceeds to S406. At S406, the model extraction portion 36 determines whether or not the road layout change in the target difference group matches the road layout change in the check-target road change model. When the road layout change in the target difference group does match the road layout change in the check-target road change model (NO at S406), the process returns to S403. When the road layout change in the target difference group matches the road layout change in the check-target road change model (YES at S406), the process proceeds to S407. At S407, the allowable judgment value of the check-target road change model is corrected with reference to data of the target difference group (e.g., allowable judgment value of road). After S407, the process returns to S401.

When it is determined at S403 that the acquired difference group has been checked against all the road change models in the road change model database 37 (YES at S403), the process proceeds to S408. At S408, the model extraction portion 36 starts a process for creating a new road change model, which is a road change model assigned a new model number. At S409, a road intended-use of the new road change model is created with reference to the data of the target difference group (e.g., the road intended-use).

At S410, a road layout change in the new road change model is created with reference to the data of the target difference group (e.g., the road layout change). At S411, an allowable judgment value of the new road change model is created with reference to the data of the target difference group (e.g., the road layout change). In the above, the allowable judgment value is set to an initial value, which is not displaced in the displacement range. At S412, a guidance information of the new road change model such as guidance message (including information on a guidance start point and a guidance end point), guidance graphical information and the like is created with reference to the data of the target difference group (e.g., the road intended-use, the road layout change etc.). Then, the new road change model including the new model number and the above-created information are stored in the road change model database 37. Thereafter, the process returns to S401 to repeat the above processing. When it is determined at S401 that all the difference groups in the difference group database 34 have been performed (YES at S401), the process illustrated in FIG. 18 is ended.

A particular example of the road layout change of the road change model will be described. The road layout change of the road change model illustrated FIG. 6A and FIG. 6B is a change from a stack type (e.g., stack interchange) to a loop type (e.g., loop ramp). As this kind of change from the stack type to the loop type, there is also a road layout change of a road change model illustrated in FIG. 19A and FIG. 19B. If a determination as to whether these two change patters are the same road layout change takes into account only the change in road shape from the loop type to the stack type, theses two road layout changes may be determined as the some road layout change, and as a result, the same guidance information may used for guidance in these road layout changes.

As can be seen the above, a matching condition for distinguishing the above two road layout changes may be necessary. For example, even when a road shape difference and a road size difference are within margins of error, it is possible to distinguish the above two road layout changes by rigorously determining whether or not the road has a fork or the like. Thus, in the present embodiment, the road layout change in the road change model (and the difference group) includes information on whether a fork newly appears in the road.

In the present embodiment, the check-target difference group is checked against all the road change models in the road change model database 37. When the road change model matching the check-target difference group is absent, a new road change model is created with reference to the data of the check-target difference group. Therefore, a necessary road change model can be sequentially created. In the present embodiment, in creating the road change model, it is possible to create and store the road intended-use, the road layout change, the allowable judgment value and the guidance information. Therefore, the process of checking the difference group against the road change model can be accurately performed, and additionally, the route guidance in the route (road) in line with the road change model can be appropriately performed. In the present embodiment, the check target difference group is checked against all the road change models in the road change model database 37, and if there is matching, the allowable judgment value of the road change model is corrected. Therefore, it is possible to improve accuracy of the road change model, and it is possible to appropriately perform the route guidance in the route (road) in line with the road change model.

Fourth Embodiment

FIG. 20 illustrates a fourth embodiment. Between the present embodiment (e.g., FIG. 20) and the first embodiment (e.g., FIG. 2), like references are used to refer to like steps and parts. In the fourth embodiment, at S501, the travel trace generation device 17 of the controller 9 imports the coordinate point (longitude and latitude) of the present position detected by the position detection device 2 every a predetermined time (e.g., 1 seconds to 5 seconds), thereby generating information on travel trace (in a manner similar to S101 in FIG. 2) and storing the generated travel trace in the memory device 5. This travel trace tells a traveling direction. Additionally, the travel trace tells a movement distance and a time taken to move the movement distance, and thus, can tell an average travel speed. Furthermore, in the present embodiment, the memory device 5 can store the information on travel trace of, for example, hundreds or thousands kilometers (or travel trace over weeks or months) as information on past travel trace. At S102, the controller 9 compares the travel trace obtained at S101 with the road shape data of the road map data acquired from the map data storage device 3, thereby determining whether or not the travel trace is in an out-of-road state. When the travel trace is in the out-of-road state (YES at S102), the process proceeds to S510. At S510, based on the information on past travel trace stored in the memory device 5, the controller 9 determines whether or not the navigation apparatus had traveled in past on a certain road of the road map data, where the certain road is a road on which the vehicle would travel if the travel trace were not in the out-of-road state. In other words, based on the information on past travel trace stored in the memory device 5, the controller 9 determines whether or not the vehicle had traveled in past on the road that is presently abandoned (abandoned road and old road). When the vehicle had traveled in past on the abandoned road (YES at S510), the process proceeds to S510 where the past travel trace in this abandoned road is read out from the memory device 5. Specifically, at S510, the abandoned road and the roads before and after the abandoned road are read out as a set.

At S103, the controller 9 compares the travel trace obtained at S501 with the accumulated out-of-road-state travel traces to determine whether or not there is a similar out-of-road-stat travel trace. A manner of accumulating the out-of-road-state travel traces will be described later. When there is no similar out-of-road state travel trace (NO at S130), the process proceeds to S104. At S104, the count of generation is set to 1 (S104). At S505, a set of the information on the travel trace in the out-of-road state (i.e., the travel trace when the vehicle travels on the new road and roads before and after the new road) and the information on the past travel trace read out at S520 (the travel trace when the vehicle had traveled on the abandoned road and roads before and after the abandoned road) is stored in the memory device 5. After S505, the process illustrated in FIG. 20 is ended. That is, the information on each of the travel traces is stored and accumulated in the memory as a newly-constructed road (new road) not present in the road map data and an already-abandoned road (abandoned road). In the above, the controller 9 can function as or correspond to a travel information collection device or means and a past travel trace information collection device or means and a second ravel trace information collection device or means.

When there is the similar travel trace (YES at S103), it is determined (S106) whether or not the count of generation of this travel trace is greater than or equal to the predetermined value. When the count of generation is less than the predetermined value (NO at S106), the count of generation is incremented by 1 (S107), and thereafter, the process illustrated in FIG. 20 is ended.

In the above way, the count of generation of the similar-out-of-road state travel trace can increase. When the count of generation reaches the predetermined value (YES at S106), the process proceeds to S508. At S508, the travel trace information accumulated at S505 is sent to the information center 21. Specifically, the information on the travel trace in the new road and the roads before and after the new road and the information on the travel trace in the abandoned road and the roads before and after the abandoned road are sent to the information center 21. Thereafter, at S509, information indicating that the above travel trace information and the like have been sent is recorded in the memory device 5. It should be noted that the recording of the information indicating that the travel trace information has been set can tell that the road corresponding to the sent travel trace has been already sent. Therefore, when the navigation apparatus travels the same road, it is possible o prevent the above process (e.g., determining the presence of a new road, sending the new road information or the like to the information center, and the like) from being performed.

Expect for the above, the fourth embodiment can be the same as the first embodiment. Therefore, the fourth embodiment can have substantially the same advantage as the first embodiment. In the fourth embodiment in particular, since the information on a new road and roads before and after the new road and the information on an abandoned road and roads before and after the abandoned road are sent as a set to the information center 21, the information can estimate a new road and an abandoned road based on the received information on a new road and roads before and after the new road and the received information on an abandoned road and roads before and after the abandoned road. Therefore, the information center 21 can improve estimation accuracy of the new road and the abandoned road.

In the above embodiments, in estimating the new road and the abandoned road, the information center 21 compares the information on travel trace in a new road, which is sent from the navigation apparatus 1 of the vehicle A, with the road change models stored in the database 24. In this regard, for example, a new road and an abandoned road may be estimated by taking into account traffic information accumulated (collected) in the information center 21. The traffic information includes, for example, traffic jam information, roadwork information or the like. This configuration enables more accurate estimation of a new road and an abandoned road, as compared with cases where a new road and an abandoned road are estimated based on only the information on travel trace in a new road and the road change models. The information center 21 may have a function to receive and collect the traffic information from, for example, VICS (registered trademark) or the like via the circuit terminal device 22, the telephone exchange 19 and the wireless base station 18. That is, the information center 21 may include a traffic information collection device or means.

In the second embodiment, the routes R1, R2 from the present position to the destination point are calculated on assumption that the presently-used road map data stored in the database 24 of the information center 21 is the same as the road map data in the navigation apparatus 1 of the vehicle B. In connection with the above, the following configuration can be employed. In typical cases, the navigation apparatuses of respective vehicles may use different versions (new version, old version) of road map data and/or may use different map data provided from different map data manufacturing companies. Additionally, the database 24 of the information center 21 may store different versions (new version, old version) of road map data and store different map data provided from different map data manufacturing companies. In view of this, when the navigation apparatus 1 of the vehicle B sends information on the destination point and the present position (departure point) of the vehicle B to the information center 21, the navigation apparatus 1 further sends identification information of the road map data such as version information, map data manufacturing company name information and the like. The information center 21 receives the identification information of the road map data in addition to the information on the destination point and the present position of the vehicle B from the navigation apparatus 1 of the vehicle B. Then, by using the road map data that is the same as the road map data in the navigation apparatus 1 of the vehicle B about the version and the map data manufacturing company, the information center 21 performs the following in a manner similar that in the second embodiment. Specifically, the information center 21 performs the process of calculating the routes R1, R2 from the present position to the destination point, and the process of calculating the points for guidance commands and contents of the guidance commands based on the calculated routes R1, R2, the road shape data, the intersection position information, the railroad crossing position information and the like. The road shape data, the intersection position information, the railroad crossing position information are stored in the road map data.

Furthermore, in order to give a consistency between algorithms (processing programs) of the route calculation process and the route guidance calculation process performed by the navigation apparatus 1 of the vehicle and those performed by the information center 21, the navigation apparatus 1 may further send program identification information for identification of the algorithms (processing programs) of the route calculation process and the route guidance calculation process when the navigation apparatus 1 sends the information on the destination point and the present position of the vehicle B and the identification information of the road map data to the information center 21. According to this configuration, even when there is a variation in algorithm (processing program) in the navigation apparatuses 1 of the vehicles, the route calculation process and the route guidance calculation process can be performed with use of the same algorithm (processing program) in the navigation apparatus 1 of the vehicle and the information center 21.

In the first embodiment, the information center 21 compares the old road map data used in past with the latest road map data updated most recently (also called a new road map data or a second road map data) to extract a lot of road change parts in which an abandoned road and a presently-available new road are present. Additionally, the information center 21 creates many kinds of road change model based on the abandoned road and the new road, and stores the road change models in the database 24. Alternatively, for example, the navigation apparatus 1 may (i) download and store the latest road map data, (ii) compare an old road map data used before the downloading with the downloaded new road map data, (iii) extract a lot of road change parts in which an abandoned road and a presently-available new road are present, (iv) create many kinds of road change model based on the abandoned road and the new road, and (v) store the road change models in the navigation apparatus 1.

Alternatively, the information center 21 or the navigation apparatus 1 may not create road change models by comparing the old road map data with the new road map data but may pre-store the road change models. Based on the information on travel trace in a new road and the road change models pre-stored in the information center 21 or the navigation apparatus 1, the new road and the abandoned road may be estimated. In the above, it may be preferable to update the road map data stored in the navigation apparatus 1.

In the third embodiment, the model generation device 31 is provided in the information center 21. Alternatively, the model generating apparatus may be provided in an in-vehicle navigation apparatus, a dedicated terminal or the like.

In the above embodiments, the navigation apparatus 1 mounted to the vehicle is illustrated as a navigation apparatus. Alternatively, the navigation apparatus 1 may be provided in a portable navigation device (PND) or a cellular phone (e.g., smart phone). Furthermore, an object mounted with the navigation apparatus 1 is not limited to a vehicle and may be any object movable on a road.

According to the present disclosure, a road information update system, a navigation apparatus, an information center and a model generation device can be configured in various forms, examples of which will be described below.

According to a first example, a road information update system including a navigation apparatus and an information center can be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data and includes: a center-side communication device that communicates with the navigation apparatus; and a model generation device that compares multiple road map data to extract a road change part in which an abandoned road and a new road are present, thereby generating multiple road change models based on the abandoned road and the new road, wherein the new road is a newly-constructed road. The navigation apparatus further includes a travel trace information collection device that, at least when the movable body travels the new road not present in the first road map data, collects information on the travel trace in the new road, wherein the travel trace is detected by the travel trace detection device, wherein the navigation-side communication device sends the collected information on the travel trace of the traveling of the new road to the information center. The information center further includes an estimation device that, upon receipt of the information on the travel trace in the new road from the navigation apparatus, estimates the new road and the abandoned road based on (i) the received information on the travel trace in the new road and (ii) the road change models generated by the model generation device. The information center incorporates the new road and the abandoned road estimated by the estimation device into the second road map data. According to this configuration of the road information update system, it is possible to estimate a road meeting an actual road situation.

The above road information update system may be configured as follows. The navigation apparatus sets a destination point and send information on the set destination point and information on a departure point of the movable body to the information center. The navigation apparatus performs, by using the first road map data, a process of calculating a first route from the departure point to the destination point and a process of calculating guidance information of the calculated first route. The information center also has the first road map data. The information center (i) receives the information on the destination point and the departure point of the movable body from the navigation apparatus, (ii) performs, by using the first road map data, the process of calculating the first route from the departure point to the destination point and the process of calculating the guidance information of the calculated first route; (iii) performs, by using the second road map data, a process of calculating a second route from the departure point to the destination point and a process of calculating guidance information of the calculated second route, (iv) compares the guidance information of the first route with the guidance information of the second route, and (v) sends guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route. The navigation apparatus (i) receives the guidance information cancellation information and the guidance information addition information from the information center and (ii) incorporates the cancellation of the guidance information and the addition of the guidance information into the guidance information of the first route based on the received guidance information cancellation information and the received guidance information addition information. According to this configuration of the road information update system, it is possible to perform route guidance meeting an actual road situation.

The guidance information may include at least one of road map data and guidance command.

The second road map data may be the road map data that reflects, with respect tot the first road map data, the new road and the abandoned road estimated by the estimation device.

The above road information update system may be configured as follows. The information center further includes a traffic information collection device that collects traffic information. In estimating the new road and the abandoned road, the estimation device of the information center takes into account the collected traffic information. In this configuration, it is possible to accurately estimate the new road and the abandoned road.

The navigation apparatus may perform route guidance from the departure point and the destination point of the movable body, based on the guidance information cancellation information and the guidance information addition information.

According to a second example of the present disclosure, a road information update system including a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes a center-side communication device that communicates with the navigation apparatus. The information center also has the first road map. The information center is configured to: receive information on a departure point and a destination point of the movable body from the navigation apparatus; perform, by using the first road map data, a process of calculating a first route from the departure point to the destination point and a process of calculating guidance information of the calculated first route; perform, by using the second road map data, a process of calculating a second route from the departure point to the destination point and a process of calculating guidance information of the calculated second route; compare the guidance information of the first route with the guidance information of the second route; and send guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route. The navigation apparatus is configured to: receive the guidance information cancellation information and the guidance information addition information from the information center; and incorporate the cancellation of the guidance information and the addition of the guidance information into the guidance information of the first route based on the received guidance information cancellation information and the received guidance information addition information. According to this configuration of the road information update system, it is possible to reduce an amount of data to be transmitted when a road data is updated in the information center.

According to a third example of the present disclosure, a navigation apparatus mountable to a movable body for traveling on a road may be configured as follows. The navigation apparatus include: a travel trace detection device that detects a travel trace of the movable body; a storage device that stores a first road map data; and a communication device that transmits information to an outside of the navigation apparatus. The navigation apparatus is configured to: send information on a departure point and a destination point of the movable body to an information center; perform, by using the first road map data, a process of calculating a first route from the departure point to the destination point of the movable body and a process of calculating guidance information of the first route; and, upon receipt of guidance information cancellation information and guidance information addition information from the information center, incorporate cancellation of the guidance information and addition of the guidance information into the guidance information of the first route based on the received guidance information cancellation information and the received guidance information addition information. According to this navigation apparatus, it is possible to perform route guidance meeting an actual road situation.

The information center may have the first road map data, which is also stored in the navigation apparatus. The information center may further have a second road map data, which is different from the first road map data. The information center may (i) receive the information on the departure point and the destination point of the movable body from the navigation apparatus, (ii) perform, by using the first road map data, the process of calculating the first route from the departure point to the destination point and the process of calculating guidance information of the calculated first route, (iii) perform, by using the second road map data, a process of calculating a second route from the departure point to the destination point and a process of calculating guidance information of the calculated second route, (iv) compare the guidance information of the first route with the guidance information of the second route, and (v) send the guidance information cancellation information and the guidance information addition information to the navigation apparatus. The guidance information cancellation information is provided for the cancellation of the guidance information that is present in the first route but is not present in the second route. The guidance information addition information is provided for the addition of the guidance information that is not present in the first route but is present in the second route.

The guidance information may include at least one of road map data and guidance command.

The navigation apparatus may send identification information, which is information for identification of the first road map data, to the information center.

The guidance information cancellation information may include information on cancellation of the guidance command and information on a map area in which map display and route display are prohibited.

According to a fourth example of the present disclosure, a navigation apparatus may be configured as follows. The navigation apparatus may include: a travel trace detection device that detects a travel trace of a movable body; a storage device that stores a first road map data; a communication device that transmits information to an outside of the navigation apparatus; and an estimation device that estimates a new road and an abandoned road based on (i) the travel trace detected by the travel trace detection device when the movable body travels on the new road detected and (ii) a road change model of the new road and the abandoned road, the road change model being provided in the navigation apparatus. The navigation apparatus incorporates the new road and the abandoned road estimated by the estimation device into the first road map data.

The road information update system may be configured as follows. The model generation device includes: a difference group generation portion that generates a difference group by grouping, as the difference group, a map difference data corresponding to a road change based on road update information or road map data; a difference group storage portion that stores the generated difference group; a model storage portion that stores multiple road change models; and a model extraction portion that (i) checks the difference group against the road change models in the model storage portion, and (ii) generates a new road change model based on the difference group in response to a mismatch between the difference group and the road change models.

Each road change model may have a model number, a road intended-use, a road layout change, an acceptable judgment value and guidance information.

If the difference group matches one of the road change models when the model extraction portion checks the difference group against the road change models in the model storage portion, the model extraction portion may make a correction to the acceptable judgment value of the one of the road change model matching the difference group.

According to a fifth example of the present disclosure, a model generation device can be configured as follows. The model generation device includes: a difference group generation portion that generates a difference group by grouping, as the difference group, a map difference data corresponding to a road change based on road update information or road map data; a difference group storage portion that stores the generated difference group; a model storage portion that stores multiple road change models; and a model extraction portion that checks the difference group against the road change models in the model storage portion, and generates a new road change model based on the difference group in response to a mismatch between the difference group and the road change models.

In the model generation device, each road change model has a model number, a road intended-use, a road layout change, an acceptable judgment value and guidance information.

If the difference group matches one of the road change models when the model extraction portion checks the difference group against the road change models in the model storage portion, the model extraction portion may make a correction to the acceptable judgment value According to a sixth example of the present disclosure, a road information update system comprising a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes: a center-side communication device and a model generation device. The center-side communication device communicates with the navigation apparatus. The model generation device compares multiple road map data to extract a road change part where an abandoned road and a new road, which is a newly-constructed road, are present. The model generation device generates multiple road change models based on the abandoned road, roads before and after the abandoned road, the new road, and roads before and after the new roads. The navigation apparatus further includes a travel trace information collection device and an estimation device. The travel trace information collection device collects information on the travel trace in the new road at least when the movable body travels on the new road not present in the first road map data, wherein the travel trace is detected by the travel trace detection device, wherein the navigation-side communication device sends the collected information on the travel trace in the new road to the information center. Upon receipt of the information on the travel trace in the new road and the roads before and after the new roads from the navigation apparatus, the estimation device estimates the new road and the abandoned road based on (i) the received information on the travel trace in the new road and the roads before and after the new road and (ii) the road change models generated by the model generation device. The information center incorporates the new road and the abandoned road estimated by the estimation device into the second road map data.

The navigation apparatus may adjust a point where the guidance information is to be outputted, based on the acceptable judgment value of the road change model.

The navigation apparatus may be configured such that before a high accuracy map data update is performed on the first road map data, the route guidance meeting an actual road situation is performable by the navigation apparatus.

According to a seventh example of the present disclosure, a road information update system comprising a navigation apparatus and an information center may be configured as follows. The navigation apparatus includes: a storage device that stores a first road map data; a travel trace detection device that detects a travel trace of a movable body; and a navigation-side communication device that transmits information to an outside of the navigation apparatus. The information center stores a second road map data, and includes a center-side communication device and a model generation device. The center-side communication device communicates with the navigation apparatus. The model generation device compares multiple road map data to extract a road change part where an abandoned road and a new road, which is a newly-constructed road, are present. The model generation device generates multiple road change models based on the abandoned road and the new road. The navigation apparatus further includes a first travel trace information collection device and a second travel trace information collection device. The first travel trace information collection device collects information on the travel trace in the new road at least when the movable body travels on the new road not present in the first road map data, wherein the travel trace is detected by the travel trace detection device. The second travel trace information collection device collects information on the travel trace in the abandoned road, which was detected in past in the first road map data by the travel trace detection device before the movable body travels on the new road. The navigation-side communication device sends the collected information on the travel trace in the new road and the collected information on the travel trace in the abandoned road to the information center. The information center further includes an estimation device. Upon receipt of the information on the travel trace in the new road and the information on the travel trace in the abandoned road from the navigation apparatus, the estimation device estimates the new road and the abandoned road based on (i) the received information on the travel trace in the new road, (ii) the received information on the travel trace in the abandoned road and (iii) the road change models generated by the model generation device. The information center incorporates the new road and the abandoned road estimated by the estimation device into the second road map data.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A road information update system comprising:
a navigation apparatus that includes:
a storage device that stores a first road map data;
a travel trace detection device that detects a travel trace of a movable body; and
a navigation-side communication device that transmits information to an outside of the navigation apparatus; and
an information center that stores a second road map data, the information center including:
a center-side communication device that communicates with the navigation apparatus; and
a model generation device that compares a plurality of road map data to extract a road change part in which an abandoned road and a new road are present, thereby generating a plurality of road change models based on the abandoned road and the new road, wherein the new road is a newly-constructed road,
wherein:
the navigation apparatus further includes
a travel trace information collection device that, at least when the movable body travels the new road not present in the first road map data, collects information on the travel trace in the new road, wherein the travel trace is detected by the travel trace detection device, wherein the navigation-side communication device sends the collected information on the travel trace of the traveling of the new road to the information center;
the information center further includes
an estimation device that, upon receipt of the information on the travel trace in the new road from the navigation apparatus, estimates the new road and the abandoned road based on (i) the received information on the travel trace in the new road and (ii) the road change models generated by the model generation device; and
the information center incorporates the new road and the abandoned road estimated by the estimation device into the second road map data;
a plurality of road change models is generated by comparing a latest road map data, which has been updated most recently, with an old road map data, which was used in the past and is older than the latest road map data;
each road change model comprises a set of the new road and the abandoned road at a particular cite, the new road and the abandoned road appearing due to a road change at the particular cite between the old road map data and the latest road map data;
the navigation apparatus is configured to set a destination point and configured to send information on the destination point and a departure point of the movable body to the information center;
the navigation apparatus is further configured to perform, by using the first road map data, a process of calculating a first route from the departure point to the destination point and a process of calculating guidance information of the calculated first route;
the information center also has the first road map data and is configured to:
receive the information on the destination point and the departure point of the movable body from the navigation apparatus;
perform, by using the first road map data, the process of calculating the first route from the departure point to the destination point and the process of calculating the guidance information of the calculated first route;
perform, by using the second road map data, a process of calculating a second route from the departure point to the destination point and a process of calculating guidance information of the calculated second route;
compare the guidance information of the first route with the guidance information of the second route; and
send guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route; and
the navigation apparatus is configured to
receive the guidance information cancellation information and the guidance information addition information from the information center; and
incorporate the cancellation of the guidance information and the addition of the guidance information into the guidance information of the first route based on the received guidance information cancellation information and the received guidance information addition information.

2. The road information update system according to claim 1, wherein:
the guidance information includes at least one of road map data and guidance command.

3. The road information update system according to claim 1, wherein:
the second road map data reflects, with respect to the first road map data, the new road and the abandoned road estimated by the estimation device.

4. The road information update system according to claim 1, wherein:
the information center further includes a traffic information collection device that collects traffic information; and
in estimating the new road and the abandoned road, the estimation device of the information center takes into account the collected traffic information.

5. A navigation apparatus configured to perform route guidance from a departure point and a destination point of a movable body, based on the guidance information cancellation information and the guidance information addition information recited in claim 1.

6. A road information update system comprising:
a navigation apparatus that includes:
a storage device that stores a first road map data;
a travel trace detection device that detects a travel trace of a movable body; and
a navigation-side communication device that transmits information to an outside of the navigation apparatus; and
an information center that stores a second road map data and includes
a center-side communication device that communicates with the navigation apparatus,
wherein:
the information center also stores the first road map data and is configured to:

receive information on a departure point and a destination point of the movable body from the navigation apparatus;

perform, by using the first road map data, a process of calculating a first route from the departure point to the destination point and a process of calculating guidance information of the calculated first route;

perform, by using the second road map data, a process of calculating a second route from the departure point to the destination point and a process of calculating guidance information of the calculated second route;

compare the guidance information of the first route with the guidance information of the second route; and send guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route; and the navigation apparatus is configured to
receive the guidance information cancellation information and the guidance information addition information from the information center, and
incorporate the cancellation of the guidance information and the addition of the guidance information into the guidance information of the first route based on the received guidance information cancellation information and the received guidance information addition information;

the second road map data stored in the information center is newer than the first road map data stored in the information center;

the first road map data stored in the information center is the same as the first road map data stored in the navigation apparatus;

the guidance information of the first route includes a point for guidance instruction and a message of the guidance instruction in the first route; the guidance information of the second route includes a point for guidance instruction and a message of the guidance instruction in the second route;

the guidance information cancellation information includes information for cancellation of the guidance instruction that is present in the guidance information of the first route but absent in the guidance information of the second route;

the guidance information addition information includes information for addition of the guidance instruction that is absent in the guidance information of the first route but present in the guidance information of the second route; and the navigation apparatus adds the guidance instruction to and cancels the guidance instruction from the guidance information of the first route according to the received guidance information cancellation information and the received guidance information addition information.

7. A navigation apparatus mountable to a movable body for traveling on a road in combination with an information center, the navigation apparatus comprising:

a travel trace detection device that detects a travel trace of the movable body;

a storage device that stores a first road map data; and a communication device that transmits information to an outside of the navigation apparatus, wherein:

the information center also stores the first road map data and is configured to:

receive information on a departure point and a destination point of the movable body from the navigation apparatus;

perform, by using the first road map data, a process of calculating a first route from the departure point to the destination point and a process of calculating guidance information of the calculated first route;

perform, by using the second road map data, a process of calculating a second route from the departure point to the destination point and a process of calculating guidance information of the calculated second route;

compare the guidance information of the first route with the guidance information of the second route; and send guidance information cancellation information and guidance information addition information to the navigation apparatus, wherein the guidance information cancellation information is provided for cancellation of the guidance information that is present in the first route but is not present in the second route, wherein the guidance information addition information is provided for addition of the guidance information that is not present in the first route but is present in the second route; and wherein the navigation apparatus is configured to:

send information on a departure point and a destination point of the movable body to the information center;

perform, by using the first road map data, a process of calculating the first route from the departure point to the destination point of the movable body and the process of calculating guidance information of the first route; and upon receipt of guidance information cancellation information and guidance information addition information from the information center, incorporate cancellation of the guidance information and addition of the guidance information into the guidance information of the first route based on the received guidance information cancellation information and the received guidance information addition information;

the second road map data stored in the information center is newer than the first road map data stored in the information center;

the first road map data stored in the information center is the same as the first road map data stored in the navigation apparatus;

the guidance information of the first route includes a point for guidance instruction and a message of the guidance instruction in the first route; the guidance information of the second route includes a point for guidance instruction and a message of the guidance instruction in the second route;

the guidance information cancellation information includes information for cancellation of the guidance instruction that is present in the guidance information of the first route but absent in the guidance information of the second route;

the guidance information addition information includes information for addition of the guidance instruction that is absent in the guidance information of the first route but present in the guidance information of the second route; and the navigation apparatus adds the guidance instruction to and cancels the guidance instruction from the guidance information of the first route according to the received guidance information cancellation information and the received guidance information addition information.

8. The navigation apparatus according to claim 7, wherein:
the information center has the first road map data, which is also stored in the navigation apparatus;
the information center further has a second road map data, which is different from the first road map data; and
the information center is configured to:
receive the information on the departure point and the destination point of the movable body from the navigation apparatus;
perform, by using the first road map data, the process of calculating the first route from the departure point to the destination point and the process of calculating guidance information of the calculated first route;
perform, by using the second road map data, a process of calculating a second route from the departure point to the destination point and a process of calculating guidance information of the calculated second route;
compare the guidance information of the first route with the guidance information of the second route; and
send the guidance information cancellation information and the guidance information addition information to the navigation apparatus, wherein the guidance information cancellation information is provided for the cancellation of the guidance information that is present in the first route but is not present in the second route, wherein the guidance information addition information is provided for the addition of the guidance information that is not present in the first route but is present in the second route.

9. The navigation apparatus according to claim 7, wherein:
the guidance information includes at least one of road map data and guidance command.

10. The road information update system according to claim 1, wherein:
the navigation apparatus sends identification information, which is information for identification of the first road map data, to the information center.

11. The road information update system according to claim 1, wherein:
the guidance information cancellation information includes information on cancellation of the guidance command and information on a map area in which map display and route display are prohibited.

12. The road information update system according to claim 1, wherein:
the model generation device includes
a difference group generation portion that generates a difference group by grouping, as the difference group, a map difference data corresponding to a road change based on road update information or road map data;
a difference group storage portion that stores the generated difference group;
a model storage portion that stores a plurality of road change models; and
a model extraction portion that
(i) checks the difference group against the road change models in the model storage portion, and
(ii) generates a new road change model based on the difference group in response to a mismatch between the difference group and the road change models.

13. The road information update system according to claim 12, wherein:
each road change model has a model number, a road intended-use, a road layout change, an acceptable judgment value and the guidance information.

14. The road information update system according to claim 13, wherein:
if the difference group matches one of the road change models when the model extraction portion checks the difference group against the road change models in the model storage portion, the model extraction portion makes a correction to the acceptable judgment value of the one of the road change model matching the difference group.

15. A road information update system comprising:
a navigation apparatus that includes
a storage device that stores a first road map data,
a travel trace detection device that detects a travel trace of a movable body, and
a navigation-side communication device that transmits information to an outside of the navigation apparatus; and
an information center that stores a second road map data and includes
a center-side communication device that communicates with the navigation apparatus, and
a model generation device that
compares a plurality of road map data to extract a road change part where an abandoned road and a new road, which is a newly-constructed road, are present, and
generates a plurality of road change models based on the abandoned road, roads before and after the abandoned road, the new road, and roads before and after the new roads,
wherein:
the navigation apparatus further includes
a travel trace information collection device that, at least when the movable body travels on the new road not present in the first road map data, collects information on the travel trace in the new road, wherein the travel trace is detected by the travel trace detection device, wherein the navigation-side communication device sends the collected information on the travel trace in the new road to the information center;
the information center further includes
an estimation device that, upon receipt of the information on the travel trace in the new road and the roads before and after the new roads from the navigation apparatus, estimates the new road and the abandoned road based on (i) the received information on the travel trace in the new road and the roads before and after the new road and (ii) the road change models generated by the model generation device; and
the information center incorporates the new road and the abandoned road estimated by the estimation device into the second road map data;
a plurality of road change models is generated by comparing a latest road map data, which has been updated most recently, with an old road map data, which was used in the past and is older than the latest road map data; and
each road change model comprises a set of the new road and the abandoned road at a particular cite, the new road and the abandoned road appearing due to a road change at the particular cite between the old road map data and the latest road map data.

16. The road information update system according to claim 13, wherein:
based on the acceptable judgment value of the road change model, the navigation apparatus adjusts a point where the guidance information is to be outputted.

17. The navigation apparatus according to claim 5, wherein:
before a high accuracy map data update is performed on the first road map data, the route guidance meeting an actual road situation is performable by the navigation apparatus.

18. A road information update system comprising:
a navigation apparatus that includes
  a storage device that stores a first road map data,
  a travel trace detection device that detects a travel trace of a movable body, and
  a navigation-side communication device that transmits information to an outside of the navigation apparatus; and
an information center that stores a second road map data and includes
  a center-side communication device that communicates with the navigation apparatus; and
  a model generation device that
    compares a plurality of road map data to extract a road change part where an abandoned road and a new road, which is a newly-constructed road, are present, and
    generates a plurality of road change models based on the abandoned road and the new road,
wherein:
the navigation apparatus further includes:
  a first travel trace information collection device that, at least when the movable body travels on the new road not present in the first road map data, collects information on the travel trace in the new road, wherein the travel trace is detected by the travel trace detection device; and
  a second travel trace information collection device that collects information on the travel trace in the abandoned road, which was detected in past in the first road map data by the travel trace detection device before the movable body travels on the new road;
the navigation-side communication device sends the collected information on the travel trace in the new road and the collected information on the travel trace in the abandoned road to the information center;
the information center further includes
  an estimation device that, upon receipt of the information on the travel trace in the new road and the information on the travel trace in the abandoned road from the navigation apparatus, estimates the new road and the abandoned road based on (i) the received information on the travel trace in the new road, (ii) the received information on the travel trace in the abandoned road and (iii) the road change models generated by the model generation device; and
the information center incorporates the new road and the abandoned road estimated by the estimation device into the second road map data;
a plurality of road change models is generated by comparing a latest road map data, which has been updated most recently, with an old road map data, which was used in the past and is older than the latest road map data; and
each road change model comprises a set of the new road and the abandoned road at a particular cite, the new road and the abandoned road appearing due to a road change at the particular cite between the old road map data and the latest road map data.

* * * * *